US010373117B1

(12) United States Patent
Sadighian et al.

(10) Patent No.: US 10,373,117 B1
(45) Date of Patent: Aug. 6, 2019

(54) INVENTORY OPTIMIZATION BASED ON LEFTOVER DEMAND DISTRIBUTION FUNCTION

(71) Applicant: Amazon Technologies, Inc., Seattle, WA (US)

(72) Inventors: Ali Sadighian, Seattle, WA (US); Hernan P. Awad, Bellevue, WA (US); Andrew Bass, Auburn, WA (US); Alvaro Maggiar, Seattle, WA (US); Stevie Robinson, Seattle, WA (US); Nicholas Deming Sherman, Mercer Island, WA (US); Chengliang Zhang, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 167 days.

(21) Appl. No.: 15/352,357

(22) Filed: Nov. 15, 2016

(51) Int. Cl.
*G06Q 10/08* (2012.01)
*G06Q 30/06* (2012.01)

(52) U.S. Cl.
CPC ..... *G06Q 10/0875* (2013.01); *G06Q 30/0605* (2013.01)

(58) Field of Classification Search
CPC .............. G06Q 10/0875; G06Q 30/0605
See application file for complete search history.

(56) References Cited

U.S. PATENT DOCUMENTS

| 5,235,508 | A | * | 8/1993 | Lirov | G06Q 10/043 700/99 |
| 6,006,196 | A | * | 12/1999 | Feigin | G06Q 10/08 705/28 |
| 6,032,123 | A | * | 2/2000 | Jameson | G06Q 10/04 700/99 |
| 6,044,361 | A | * | 3/2000 | Kalagnanam | G06Q 10/04 705/28 |
| 6,684,193 | B1 | * | 1/2004 | Chavez | G06Q 10/04 705/7.25 |
| 6,910,017 | B1 | * | 6/2005 | Woo | G06Q 10/06 705/29 |
| 6,970,841 | B1 | * | 11/2005 | Cheng | G06Q 10/0631 705/22 |
| 7,379,890 | B2 | * | 5/2008 | Myr | G06Q 10/06375 705/7.29 |

(Continued)

OTHER PUBLICATIONS

Caflisch, Russel E., "Monte Carlo and Quasi-Monte Carlo Methods," *Acta Numerica*, Cambridge University Press (1998), pp. 1-49.

*Primary Examiner* — Peter Ludwig
*Assistant Examiner* — Michael Jared Walker
(74) *Attorney, Agent, or Firm* — Kilpatrick Townsend & Stockton LLP

(57) ABSTRACT

Embodiments herein are directed to determining an expected demand for an item. The specialized computer system can model an impact to an expected demand for the item between a current planning horizon and a next planning horizon, including an estimated leftover demand to be fulfilled during the next planning horizon. As calculated, this leftover demand may be less than an unfulfilled demand from the current planning horizon and may be estimated based at least in part on the unfulfilled demand and on historical leftover demand between planning horizons.

21 Claims, 18 Drawing Sheets

(56) References Cited

U.S. PATENT DOCUMENTS

| | | | |
|---|---|---|---|
| 8,732,040 B1* | 5/2014 | Prabhune | G06Q 20/203 705/22 |
| 2002/0026347 A1* | 2/2002 | Yanagino | G06Q 10/06 705/7.31 |
| 2004/0148217 A1* | 7/2004 | Lauring | G06Q 10/06314 705/7.24 |
| 2005/0075951 A1* | 4/2005 | Zieger | G06Q 10/043 705/28 |
| 2006/0026072 A1* | 2/2006 | Suguro | G06Q 10/087 705/300 |
| 2006/0085321 A1* | 4/2006 | Staib | G06Q 10/04 705/37 |
| 2006/0224482 A1* | 10/2006 | Aragones | G06Q 40/00 705/35 |
| 2008/0176577 A1* | 7/2008 | Bourlas | H04L 5/023 455/454 |
| 2009/0319323 A1* | 12/2009 | Fishman | G06Q 10/10 705/80 |
| 2010/0332273 A1* | 12/2010 | Balasubramanian | G06Q 10/08 705/332 |
| 2012/0323637 A1* | 12/2012 | Cushing | G06Q 10/06 705/7.36 |
| 2013/0290150 A1* | 10/2013 | Weerahandi | G06Q 10/08 705/28 |
| 2014/0149244 A1* | 5/2014 | Abhyanker | G06Q 10/087 705/26.2 |
| 2014/0200946 A1* | 7/2014 | Humphries | G06Q 10/06315 705/7.25 |
| 2014/0214580 A1* | 7/2014 | Balduccini | G06Q 30/0605 705/26.2 |
| 2014/0379509 A1* | 12/2014 | Sasa | G06Q 30/06 705/26.2 |
| 2015/0066566 A1* | 3/2015 | Ervolina | G06Q 10/06315 705/7.25 |
| 2015/0161545 A1* | 6/2015 | Willemain | G06Q 10/06315 705/7.25 |
| 2016/0027026 A1* | 1/2016 | Matsui | G06Q 30/0202 705/7.31 |
| 2016/0063419 A1* | 3/2016 | Martinez | G06Q 10/06315 705/7.25 |
| 2016/0260109 A1* | 9/2016 | Feng | G06Q 30/0202 |
| 2016/0321606 A1* | 11/2016 | Kapil | G06Q 10/0875 |
| 2018/0121863 A1* | 5/2018 | Lin | G06Q 10/083 |

\* cited by examiner

INVENTORY OPTIMIZATION BASED ON LEFTOVER DEMAND DISTRIBUTION FUNCTION

BACKGROUND

Modern inventory systems, such as those in mail order warehouses, supply chain distribution centers, airport luggage systems, and custom-order manufacturing facilities, face significant challenges in responding to requests for inventory items. As inventory systems grow, the challenges of simultaneously completing a large number of packing, storing, and other inventory-related tasks become nontrivial. In inventory systems tasked with responding to large numbers of diverse inventory requests, inefficient utilization of system resources, including space, equipment, and manpower, can result in lower throughput, where too many or too few items result in inefficiencies for utilizing the underlying resources, unacceptably long response times, an ever-increasing backlog of unfinished tasks, and, in general, poor system performance. Additionally, expanding or reducing the size or capabilities of many inventory systems requires significant changes to existing infrastructure and equipment. As a result, the cost of incremental changes to capacity or functionality may be prohibitively expensive, limiting the ability of the system to accommodate fluctuations in system throughput.

BRIEF DESCRIPTION OF THE DRAWINGS

Various embodiments in accordance with the present disclosure will be described with reference to the drawings, in which.

DETAILED DESCRIPTION

Figure 1:
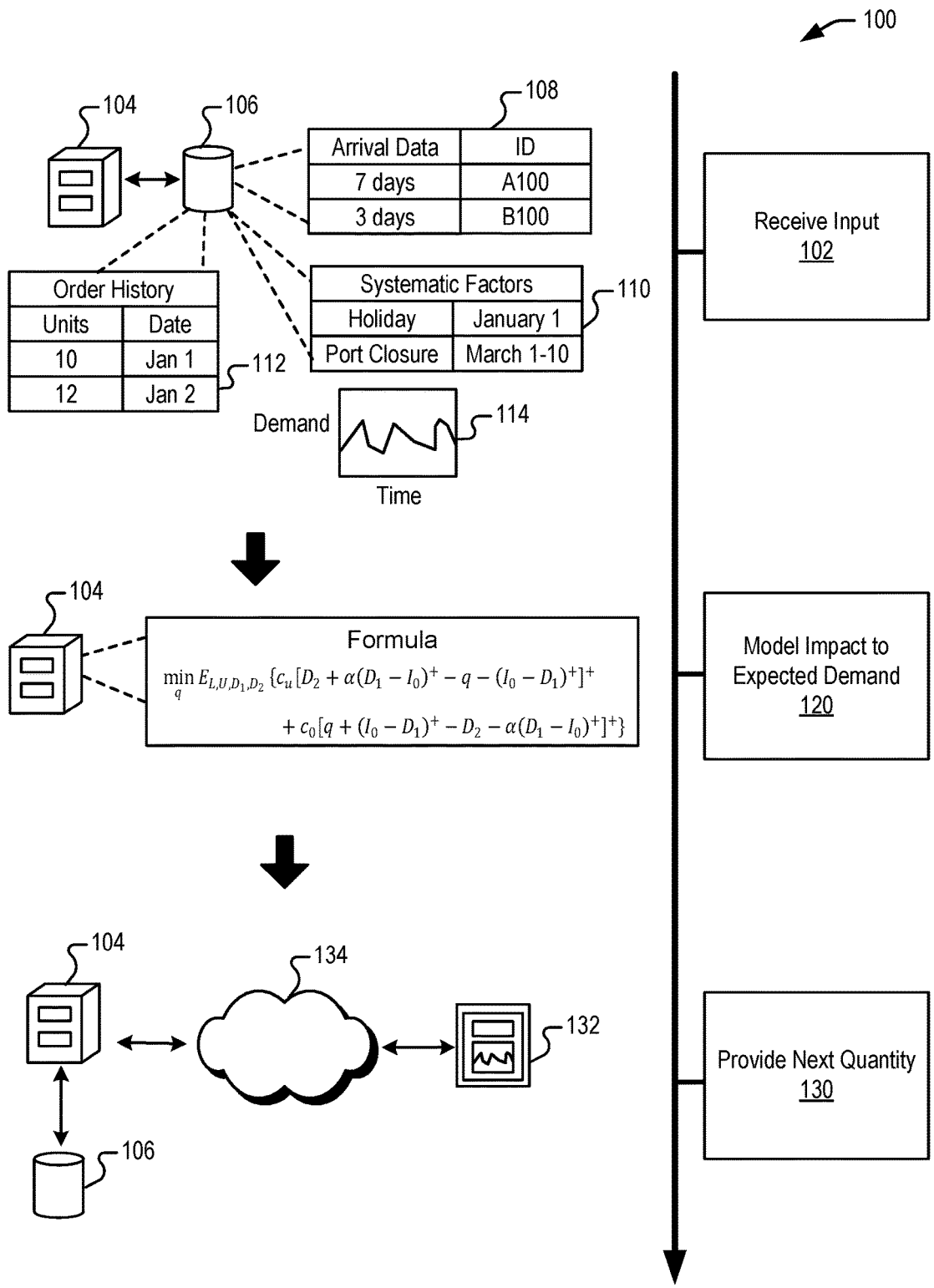
FIG. 1 illustrates an illustrative flow for determining a next quantity for an item described herein, according to at least one example.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Embodiments of the present disclosure are directed to, among other things, an inventory management system for managing an inventory, including the flow of items in and out of a storage facility and the utilization of resources to support the flow. In an example, the system may be configured to determine an expect demand and, accordingly, manage the flow and the resources. Once the expected demand is determined, the inventory management system may generate one or more quantity orders (PO), order plans, or resource utilization plans for distribution to subscribing systems. These plans may correspond with statistical models and the input received by the system.

The inventory management system may receive input associated with one or more items. The input may describe a quantity of the item available from one or more inventory facilities associated with the system (e.g., fulfillment center (FC), third party item provider, supplier, etc.). The inventory management system may model an impact to an expected demand for the item between a current planning horizon and a next planning horizon based at least in part on the received input. The planning horizon, for example, may include a date or time range until an item provider receives a next order (e.g., not an order for item inventory that is placed today, but the next order placed, etc.).

This model may include various computations and determinations. For example, the model may estimate a shortage in the quantity of the item within a current planning horizon based at least in part on a demand distribution function for the current planning horizon and on the quantity of the item. In another example, the model may estimate an unfulfilled demand during the current planning horizon based at least in part on the shortage. In another example, the model may estimate a leftover demand from the current planning horizon to be fulfilled in the next planning horizon. This may consider the likelihood of users finding the item from a different source or waiting for the initial source to restock the item. The leftover demand may be less than the unfulfilled demand and estimated based at least in part on the unfulfilled demand and on historical leftover demand between planning horizons.

The system may compute a next quantity of the item to order for the next planning horizon. The computation of the next quantity item may be based at least in part on an optimization model, the estimation model configured to output the next quantity based at least in part on a demand distribution function for the next planning horizon, a supply distribution function for the next planning horizon, and the leftover demand. The system may provide the next quantity of the item to an ordering system of the inventory management system. An ordering system may accordingly order the items from suppliers. A resource system may accordingly deploy resources to prepare for, receive, stock, pick, pack, and initiate delivery of the ordered items.

In an illustrative example, a computer may estimate the quantity for a merchant to order, and provide that quantity to the merchant or ordering system that supplies the merchant with items. The quantity estimate may be based on input (e.g., order history, current quantities of the item in a fulfillment center, how long it will take to get more items via shipping channels, historical leftover demand, etc.). The computer can then estimate the quantity needed by including, at least, (1) the quantity of items that might be ordered for a following week and (2) the quantity of items that were wanted last week, but unavailable because inventory ran out. This may increase the orders when the items are replenished above the expected demand. The computer may also remove the quantity of items that were lost because the items were not available when the item was initially wanted.

This process may differ from a generic ordering process. For example, an item provider may order 10 gallons of milk per week to sell at their store. The item provider may determine that 10 gallons of milk per week is, on average, would satisfy demand for most weeks. This generic ordering process may be inefficient without algorithmically determining an estimated demand for the milk for the following week, after the current inventory has arrived, and/or lost profits. For example, when the demand exceeds 10 gallons of milk in a week, the item provider may be unable to sell additional gallons of milk for a profit (e.g., lost profit, etc.). In another example, the demand may be lower than 10 gallons of milk per week and the item provider may be forced to store the extra milk, which can take space from other items offered by the item provider that might sell during that same time frame (e.g., cost of capacity, etc.). This may also lose profits because the item provider might not have extra capital to order additional items to sell (e.g., cost of capital, etc.).

The calculations may also vary by item. For example, the consumer that would like to order a gallon of milk may not return when the item is not available from the item provider. Conversely, the consumer that would like to order a wedding ring or wedding cake, for example, may return. A similar comparison may be made between a single item provider that offers both wedding cakes and generic wedding favors. As such, the item provider may not need to provide the wedding ring or wedding cake in advance, since this consumer's order might not convert to a lost sale when the item provider does not have the item immediately available to order, in comparison to the consumer who might expect the generic wedding favors to be available. Other items may vary as well, including text books or electronics. With these types of items, some users may wait for the item to become available and some users may become a lost sale for that item provider. The lost sales consumers may order the item from another item provider that has the item in stock. Various input described herein may help estimate an expected demand or leftover demand for these types of items.

Embodiments described herein consider several factors in mathematical computations to help optimize the ordering process. By optimizing the ordering process, the calculations can maximize order quantity for an expected demand, at least in part to minimize lost sales. Technical benefits may also be realized, including fewer and more efficient computations and, in many instances, minimized processing time to estimate the item quantity. In some examples, a physical number of items ordered from an item provider or supplier can result from implementation of the mathematical computations described herein, rather than an abstract value or otherwise abstract process implemented in a business-type method. In some examples, the process may be used to adjust or update a user interface for ordering the identified items.

New data types may be analyzed as well. For example, conventional systems may assume that demand for an item is either completely lost or completely fulfilled, where these systems might consider demand in an absolute zero or one scenario. In examples of this disclosure, as discussed, the expected demand may be calculated. A portion of the expected demand may be retained through multiple planning horizons, even when the item is out-of-stock, and/or a percentage of the expected demand may also lost.

New calculations or algorithms may be determined as well. For example, using the new data and/or existing data types, new calculations or algorithms may be used, as discussed throughout the disclosure. These calculations or algorithms may determine the expected demand through multiple planning horizons.

Several additional technical benefits may exist as well. For example, the inventory management system may be implemented as part of managing the inventorying of items for one or more storage facilities. In this example, inventorying items relies on resources, such as material handling equipment, to handle the items. By ordering an optimal quantity of items (e.g., based on expected demand, leftover demand, fluctuations in providing orders, etc.), the utilization of the resources may be optimized. This may include optimizing the use of resources, increasing efficiency of using available resources, maximizing throughput of items in and out of the storage facilities, and, in some examples, optimizing storage capacity of the facilities.

The following description is provided with reference to various figures and equations. The description here and elsewhere in the application is provided for explanation and illustration and may not be limiting on the processes for computing a next quantity of the item to order.

FIG. 1 illustrates an illustrative flow for determining a next quantity for an item described herein, according to at least one example. The process 100 can begin with receiving an input at 102. For example, a computer system 104 (e.g., inventory management system described with FIG. 3, etc.) can interact with a data store 106 to access various forms of input. The input can include arrival data 108, systematic factors 110, order history 112, demand over time data 114, or other types of information as input. Input may be stored with the data store 106 without diverting from the scope of the disclosure.

The input can include arrival data 108. The arrival data 108 may represent information about an expected date that an item arrives to a location (e.g., a storage facility). The expected date may be variable and expressed with a distribution function. As illustrated, item A100 may arrive in seven days and item B100 may arrive in three days. The arrival data 108 associated with these items may be based on various information, including estimated ship dates from the item provider or supplier, estimated receipt dates from a fulfillment center, historical arrival times (e.g., of the supplier, of the vehicle, etc.), and the like. In some examples, the variability of arrival data 108 may vary on a per vendor/supplier basis.

The arrival data 108 may be based in part on an arrival of a vehicle that provides more than one item to an item provider at a time. For example, the vehicle may arrive on Thursdays and carry most of the inventory that is provided by the item provider, irrespective of whether the items are ordered Monday, Tuesday, or Wednesday.

The arrival data 108 may include any orders that are submitted to suppliers. For example, when items corresponding with the orders are determined to arrive at a beginning of the planning horizon, these items may be considered as current inventory and/or available to use to fulfill demand. When the items corresponding with the orders are determined to arrive at an end of the planning horizon, then they may not be considered as part of the demand that materialized prior the arrival of the items.

The arrival data 108 may be updated. For example, arrival data 108 may be determined or received 10 days in advance of an arrival date. As the arrival date gets closer, the arrival data 108 may be updated to provide a more accurate arrival date, time, or other information. Some of the arrival data 108 may be affected by systematic factors 110, supply of an item that is currently available in a fulfillment center, historical supply data, vendor lead time, or other timing factors.

The input can include systematic factors 110. The systematic factors 110 may represent a factor external or internal to a storage facility that may impact the arrival data of an item in connection with the storage facility. External systematic factors 110 can include, for example, weather or holidays. Internal systematic factors 110 can include, for example, labor capacity, underlying resource availability, etc. The systematic factors 110 may be variable and expressed with a distribution function. As illustrated, systematic factors 110 may include inclement weather that affects shipping and/or delivery times of particular items. In some examples, the systematic factors 110 may include national or regional holidays, or closures associated with item providers or suppliers. The systematic factors 110 may correspond with a particular day or a range of days.

The systematic factors 110 may include other factors as well. For example, an item may correspond with a promotion to increase orders. The promotion may be provided for a particular date or date range, based at least in part on a geographic region of the user or item provider, or other factors.

The input can include order history 112. The order history 112 may represent information about one or more previous orders of items from the system. The order history 112 may be variable and expressed with a distribution function. As illustrated, the order history 112 may identify a number of items ordered per user from an item provider. The order history 112 may correspond with many item providers that provide items through an electronic marketplace (e.g., associated with an inventory management system described in FIG. 3). For example, the order history 112 may include a particular user that ordered a gallon of milk from a first item provider on January $1^{st}$ and a gallon of orange juice from a second item provider on January $2^{nd}$.

The input can include demand over time data 114. The demand over time data 114 may represent information about the number of orders for items and/or a quantity of items requested for orders as a function of time. The demand over time data 114 may be variable and expressed with a distribution function. As illustrated, demand over time data 114 can include the number of users that interacted with an item provider at a particular time to request a particular item. For example, ten users may access a network page on January $1^{st}$ that is provided by the item provider and/or the inventory management system that assists the item provider in providing the item. On January $2^{nd}$, eleven users may access the network page for the same item. The demand over time 114 can be stored as integer values and/or presented in charts for the item provider, or used in analysis for modeling expected demand for the item.

The demand over time data 114 can also consider pre-orders. For example, the user may be provided with the option to order the item while the item is out-of-stock. This might delay the delivery of the item from the item provider to the user, but the user might not need to revisit the item provider (and/or a network page provided by the item provider) to order the item at a later date. In some examples, this pre-order data may affect lost sales.

The input can include lost sales data. In an example, the lost sales data may be generated by lost sales models. For example, the lost sales model may determine whether a consumer may wait to order a particular item from an item provider when the item is out-of-stock, or leave the item provider to order the particular item from a different item provider that has the item in stock. In some examples, the demand for the item may be lost to the item provider.

The process 100 may also model an impact to expected demand at 120. For example, the computer system 104 can model an impact to an expected demand for the item between a current planning horizon and a next planning horizon. In some examples, the model may determine a percentage of the demand that is lost during an out-of-stock period as a function of time to availability. Additional information associated with estimating the leftover demand may be described with FIGS. 4-17, including the following formula that minimizes, at least in part cost of under-ordering the item and cost of over-ordering the item:

$$\min_q E_{L,U,D_1,D_2} \{c_u[D_2 + \alpha(D_1 - I_0)^+ - q - (I_0 - D_1)^+]^+ +$$
$$c_o[q + (I_0 - D_1)^+ - D_2 - \alpha(D_1 - I_0)^+]^+\}$$

Where:
  BP ordering period
  L(V $LT_1$) lead time of the current order that is being placed
  V $LT_2$ lead time of the next order that will be placed
  U planning horizon (=BP+V $LT_2$)
  $c_u$ underage cost per unit
  $c_o$ overage cost per unit
  $D_{[t_1,t_2]}$ random demand between $t_1$ and $t_2$
  $D_1$ random demand between 0 and L, i.e. $D_{[0,L]}$
  $D_2$ random demand between L and U, i.e. $D_{[L,U]}$
  $I_0$ on-hand inventory and supply arrival during [0, L]
  $I_{PH}$ on-hand inventory and supply arrival during the planning horizon [0, U]
  $I_{L-PH}$ $I_{PH}$–$I_0$ (supply arrival during [L, U])
  E expectation
  α the percentage of the unfilled demand that is backlogged In some examples, the calculation may correspond with $$\min_q$$

=minimum quantity; E=estimation; L, U, D1, and D2=demand for different time periods; $c_u$ is underage cost; $c_O$ is overage cost; $I_O$=initial inventory; and $\alpha$=estimate of a leftover demand that can be filled during the planning horizon.

The model may estimate a shortage in the quantity of the item within a current planning horizon. This shortage may be based at least in part on a "demand distribution" function for the current planning horizon and on the quantity of the item. In some examples, a leftover demand may be considered when estimating a shortage in the quantity of the item. Some examples of this demand distribution are described throughout the disclosure, including with FIGS. 4-5 and 10-13, in addition to procedural or machine learning algorithms 1 and 2.

As a sample illustration, a particular item may be out-of-stock during a seven-day week and the last day of the week, the item may be restocked. The first day, the model may estimate that half of the demand is lost. On the second day, the model may estimate 40% of the demand is lost. The loss of demand may decrease with the model as a function of time and item availability. As the time to restocking the item is closer, the model may determine the amount of loss becomes smaller. On the last day of the week, the item may be restocked and the loss of demand may be zero.

The model may estimate an unfulfilled demand during the current planning horizon based at least in part on the shortage. Some examples of unfilled demand are described throughout the disclosure, including with FIGS. 4-5 and 14.

As a sample illustration, an item provider may order twenty items. The first week, the demand may include ten items. Users may order those ten items, which can be satisfied with the in-stock twenty items. The second week, the demand may be eleven items. If the item provider does not order any more items, ten of those items may be ordered by users and one user may correspond with unfilled demand, since there were ten items ordered and one item unavailable to order. If the user decides to stay with the item provider instead of going to another item provider for that item, the one item may be carried over to the following week, when a new shipment of items may be delivered. If the user decides to leave the item provider for a different item provider, that item may be lost to the original item provider as a lost sale.

Further with the illustration, there may be nine items left for the following week. If there is another ten items of demand, only nine units may be satisfied, leaving one remaining item corresponding with one user. That user may correspond with unfilled demand and/or a lost sale (e.g., the user orders the item from a different item provider, etc.). The end the week can result with no inventory left for the item provider.

The model may estimate leftover demand to be fulfilled in the next planning horizon, at least in part to produce leftover demand data. The leftover demand data may, for example, identify leftover demand over a planning horizon. The computer may receive and/or determine historical leftover demand data for an item over multiple planning horizons. For example, the leftover demand may be less than the unfulfilled demand. In another example, the leftover demand may be estimated based at least in part on the unfulfilled demand and on historical leftover demand between planning horizons. For example, as illustrated, the leftover demand may correspond with the user that decides to stay with the item provider instead of going to another item provider for that item. Some examples of unfilled demand are described throughout the disclosure, including with FIGS. 4-5 and 14.

In some examples, the historical leftover demand data for an item over multiple planning horizons. For example, the leftover demand may comprise a historical supply shortage of the item. In some examples, the historical leftover demand data may be associated with historical impacts to a demand for the item. In some examples, the leftover demand may be estimated based at least in part on a likelihood of a returning demand in the next planning horizon given a current supply shortage of the item in the current planning horizon. In some examples, the likelihood is based at least in part on the historical supply shortage and the associated historical impacts. In some examples, the historical leftover demand data may comprise a likelihood that is estimated based at least in part on a procedural or machine learning algorithm, the algorithm being trained based at least in part on the historical leftover demand data.

Historical leftover demand may be determined through various methods. For example, the computer system 104 may use one or more of the procedural or machine learning algorithms discussed herein including with FIGS. 4-5 and 10-13. In another example, the computer system 104 may use A/B testing. The historical data may be specific to A/B testing. As a sample illustration, in one week, the computer system 104 may determine a shortage to certain quantity of item. The computer system 104 may measure the demand early in the next week. In another week, the computer system 104 may determine a shortage to another quantity of item and measure the demand again in the next week, and so on and so forth. By varying the quantities and measuring the demand, the computer system 104 may detect a pattern of returning demand. This pattern may indicate the impact to the demand, and can be used to determine the historical leftover demand as a function of the shortage.

In another example, the computer system 104 may determine a velocity of demand. As a sample illustration, the computer system 104 may determine historical data for a first week and may determine that the historical data indicates a shortage for that week by a certain quantity. The computer system 104 may analyze data for the next week and to determine a quantity of demand early in the week. The computer system 104 may compare that demand to a week where there was no prior shortage. The change to the demand may be attributed to the shortage and may be equal to the historical leftover demand between that first week and the next one.

The process 100 may also provide the next quantity at 130. For example, the computer system 104 may compute a next quantity of the item to order for the next planning horizon. The next quantity may be computed based at least in part on an optimization model that utilizes the modeled impact to the expected demand. Some examples of the optimization model or optimization formula are described throughout the disclosure, including with FIG. 4.

The computer system 104 may compute a next quantity of the item to order based at least in part on a supply distribution function for the next planning horizon. This may include, for example, an expected received supply from a previous order and/or may vary over time. The supply distribution function (CDF) may be determinative based at least in part on whether an item is supplied on time.

In some examples, an item may correspond with an arrival date. The arrival date of an item may be variable because it may take longer or shorter for a supplier to supply the item (e.g., procure, manufacture, etc.). In some examples, it may take longer or shorter for the item to arrive to a storage facility. This variability can be expressed as a supply distribution function (CDF) based at least in part on historical data about supplying the item from the supplier to the storage facility. The supply distribution function (CDF) may represent a probability to be equal or less than a certain facility, where the probability may be whether the item can be supplied by a certain date.

In some examples, the computer may estimate a lead time for an item based at least in part on a supply distribution function for the item. The cumulative likelihood of the item being supplied on time may correspond with the CDF. In some examples, the next quantity ordered by an ordering system may be estimated by at least inputting the lead time and the leftover demand to the optimization model.

The computer system 104 may compute a next quantity of the item to order based at least in part on leftover demand data, historical leftover demand data, and/or leftover demand for an item. The next quantity of the item to order may factor in any formula, model, or calculation described herein, including the optimization model, supply distribution function for the next planning horizon, and the historical leftover data.

The computer system 104 may provide the next quantity of the item (e.g., to a user device, to an ordering system, to an item provider, to a supplier, etc.). For example, the computer system 104 can interact with the data store 106 to receive the next quantity, item description, or other information and provide an order for the next quantity of the item to an ordering system 132. The ordering system 132 may be associated with the computer system 104 (e.g., an inventory management system) and/or user device.

Figure 2:
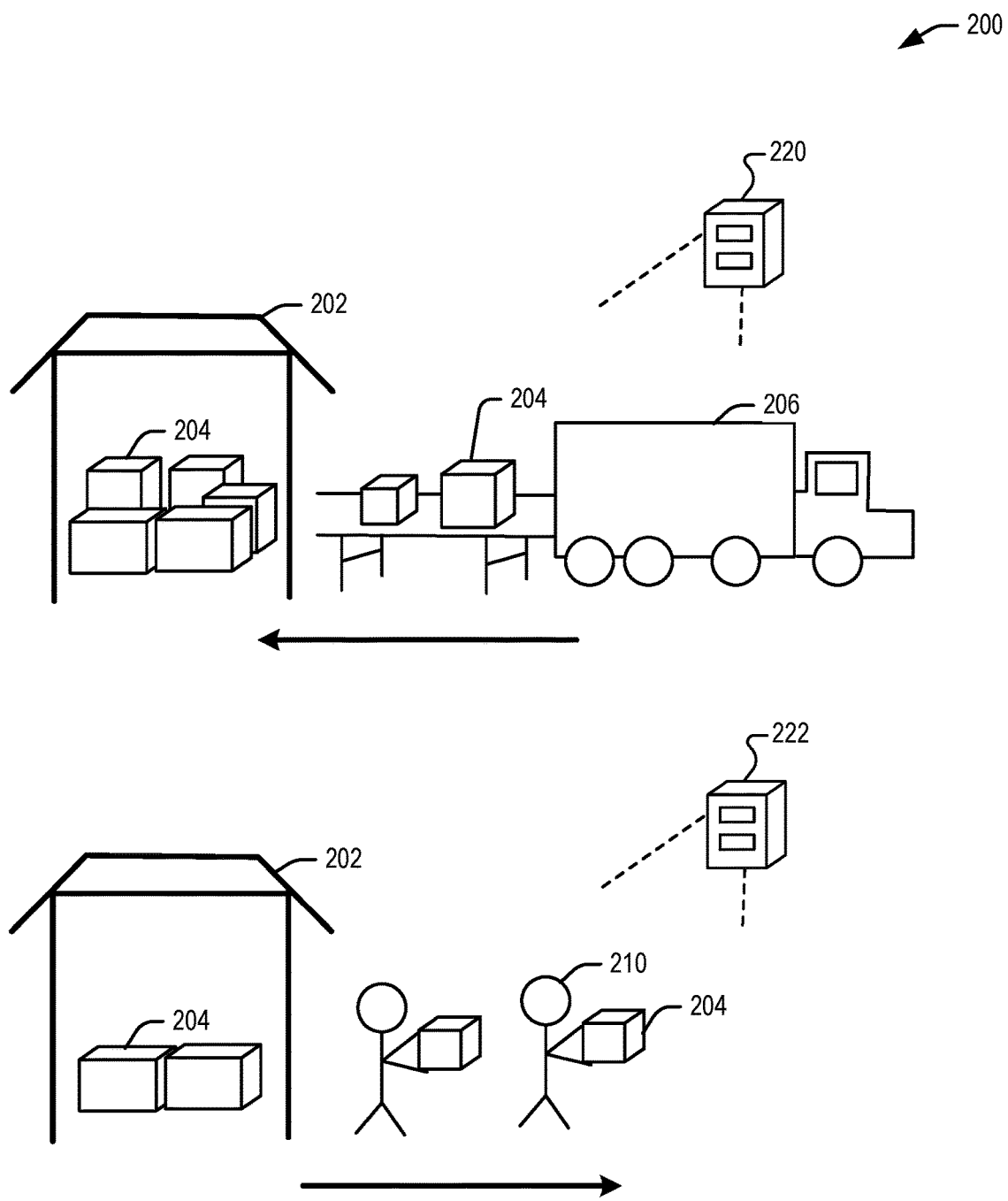
FIG. 2 illustrates an example flow of items in and out of a fulfillment center, according to at least one example.

FIG. 2 illustrates an example flow of items in and out of a fulfillment center, according to at least one example. For example, in illustration 200, a fulfillment center 202 may receive items 204 from one or more sources, including suppliers, vendors, or item providers. The items 204 may arrive through various methods, including on shipping trucks 206, boxes, shipping crates, totes, inventory holders, and the like. After the items arrive at the fulfillment center, users 210 may order items 204. The items 204 may be provided to the users 210 when the items 204 are available to order and ship to the users 210. In some examples, separate computer systems 220 and 222 may be used to implement various portions of these processes with conventional systems, including computer system 220 to manage one or more sources for the fulfillment center 202 and computer system 222 to manage ordering and shipping to users 210.

In some examples, illustration 200 helps illustrate some technical challenges with conventional systems that can be solved and/or methods that may be optimized by embodiments discussed herein. For example, the fulfillment center 202 may have a limit on the quantity of items 204 available to provide to the users 210, including via the delivery or receipt methods (e.g., throughput, etc.) or in the physical space available to store the items 204 before they are ordered by the users 210 (e.g., limitations on space capacity, etc.). The material handling equipment utilized in receiving, storing, and/or providing items may also be restricted (e.g., if a truck is overused, the overuse may necessitate higher maintenance of the truck, etc.). The items 204 may also correspond with a limit (e.g., stocking too many perishable items may result in spoilage of some of the items on the long term, etc.).

In some examples, a shipping or receiving capacity may be capped. For example, shipping trucks 206 may have a limited capacity to carry a limited number of items 204 in a shipment. The shipping trucks 206 may also be limited to a number of hours that drivers can drive the shipping trucks 206, routes the drivers can take, methods of transportation (e.g., driver can drive a truck, but not a plane or a train, etc.), maintenance schedules of trucks 206, or any other physical limitations of transporting items 204. In some examples, users 210 may also be limited to a quantity that they can order at one time (e.g., based on a limit set by a funds issuer, based on a limit of space identified by their home size, etc.).

Storing, receiving orders, and providing items that correspond with these orders may necessitate careful planning, deployment, and management of resources, including material handling equipment. Ordering sub-optimal quantities of items can lead to inefficiencies or over-utilization of the resources. Specifically, if too few items are ordered, the resources may be under-utilized, sitting idle, or otherwise resulting in inefficiencies and waste. On the other hand, if too many items are ordered, the resources may be over-committed, resulting in bottlenecks and potentially shorter lifespan of the material handling equipment (e.g., exceeding 100,000 miles on a shipping truck 206, etc.). Additionally, embodiments of the disclosure may combine computer systems 220 and 222 into one computer system with one or more computers to enhance the efficiency and calculations throughout the item receiving, ordering, and delivery processes.

As such, predicting consumer behavior is nearly impossible. For example, a merchant may stock their shelves with items that would customarily be purchased within a week. If too many items are ordered from an item supplier, the cost of storing those items negatively affects the merchant (e.g., cost of storage, maintaining freshness of the items when the items are not purchased by consumers, etc.), while the cost of not ordering enough items can also negatively affect the merchant (e.g., lost profit, reputation of maintaining low inventory, etc.).

Additionally, with so much competition, the consumers may or may not purchase items from other merchants when the first merchant is out-of-stock. For example, consumers may expect a merchant not to stock a wedding cake, so they will wait until the item is available from the merchant. However, if the item is a gallon of milk, the consumer will simply visit another merchant. For other items that are out-of-stock, some consumers will leave and others will wait for the item to be replenished. This process is especially troublesome when the merchant needs to restock their shelves for the following week and later, since they are left to guess how many items to order from item suppliers without any calculation or method.

Figure 3:
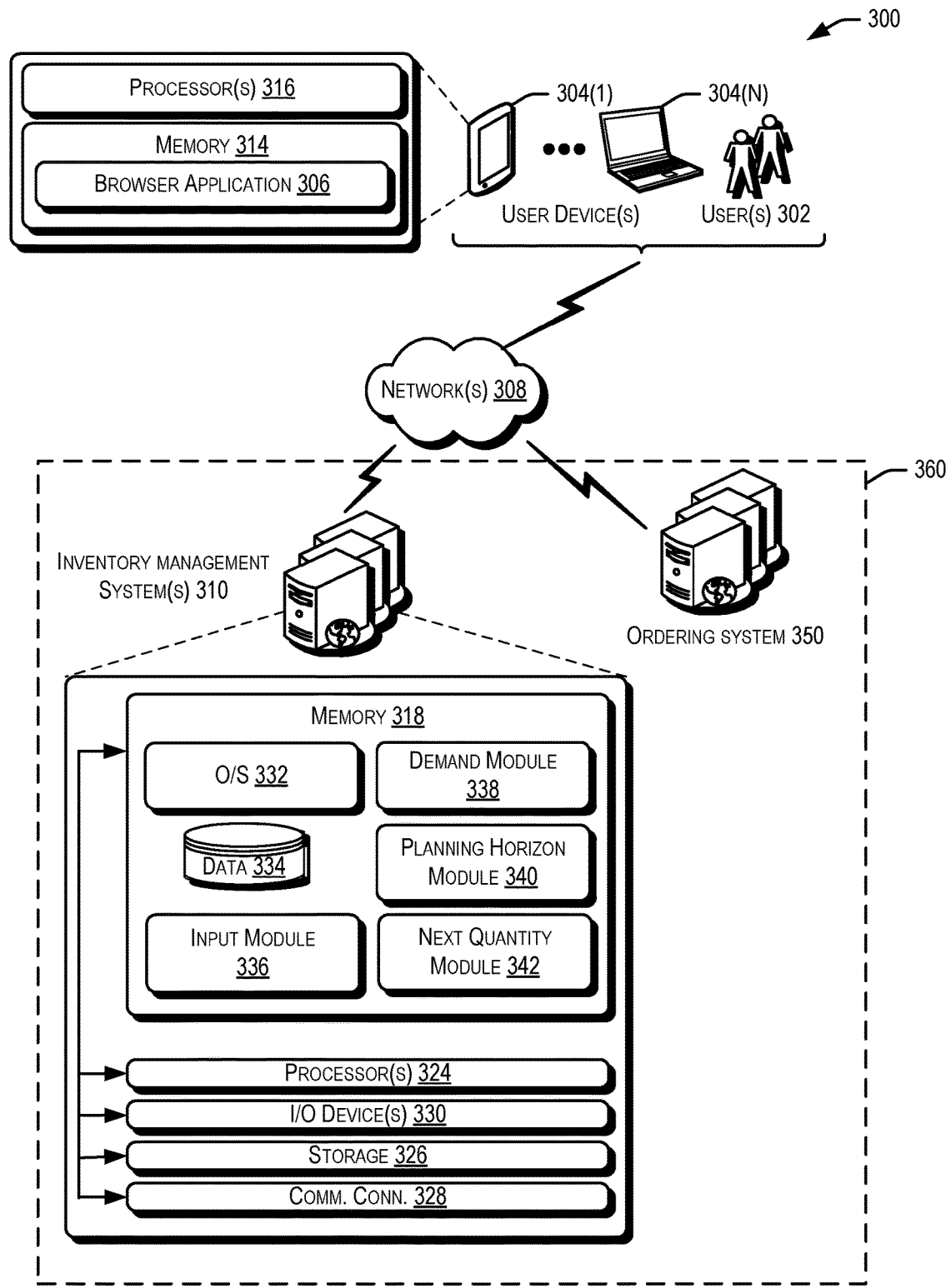
FIG. 3 illustrates an example architecture for determining a next quantity for an item described herein that includes an inventory management system, ordering system, and/or a user device connected via one or more networks, according to at least one example.

FIG. 3 illustrates an example architecture for determining a next quantity for an item described herein that includes an inventory management system, ordering system, and/or a user device connected via one or more networks, according to at least one example. In architecture 300, one or more users 302 (i.e., web browser users) may utilize user computing devices 304(1)-(N) (collectively, user devices 304) to access an application 306 (e.g., a web browser), via one or more networks 308. In some aspects, the application 306 may be hosted, managed, and/or provided by a computing resources service or service provider, such as by utilizing one or more service provider computers and/or one or more inventory management system(s) 310. The one or more inventory management system(s) 310 may, in some examples, provide computing resources such as, but not limited to, client entities, low latency data storage, durable data storage, data access, management, virtualization, cloud-based software solutions, electronic content performance management, etc. The one or more inventory management system(s) 310 may also be operable to provide web hosting, computer application development, and/or implementation platforms, combinations of the foregoing, or the like to the one or more users 302.

The one or more inventory management system(s) 310, in some examples, may help compute a next quantity of an item to order and/or provide the next quantity of the item to an ordering system 350 or to one or more user devices 304. In some examples, the one or more inventory management system(s) 310 and the ordering system 350 may be separate systems, or may be combined as a single entity, as illustrated with the inventory management system 360.

In some examples, the networks 308 may include any one or a combination of many different types of networks, such as cable networks, the Internet, wireless networks, cellular networks and other private and/or public networks. While the illustrated example represents the users 302 accessing the application 306 over the networks 308, the described techniques may equally apply in instances where the users 302 interact with the inventory management system(s) 310 via the one or more user devices 304 over a landline phone, via a kiosk, or in any other manner. It is also noted that the described techniques may apply in other client/server arrangements (e.g., set-top boxes, etc.), as well as in non-client/server arrangements (e.g., locally stored applications, etc.).

As described briefly above, the application 306 may allow the users 302 to interact with a service provider computer, such as to access web content (e.g., web pages, music, video, etc.). The one or more inventory management system(s) 310, perhaps arranged in a cluster of servers or as a server farm, may host the application 306 and/or cloud-based software services. Other server architectures may also be used to host the application 306. The application 306 may be capable of handling requests from many users 302 and serving, in response, various item web pages. The application 306 can provide any type of website that supports user interaction, including social networking sites, online retailers, informational sites, blog sites, search engine sites, news and entertainment sites, and so forth. As discussed above, the described techniques can similarly be implemented outside of the application 306, such as with other applications running on the user devices 304.

The user devices 304 may be any type of computing device such as, but not limited to, a mobile phone, a smart phone, a personal digital assistant (PDA), a laptop computer, a desktop computer, a thin-client device, a tablet PC, an electronic book (e-book) reader, etc. In some examples, the user devices 304 may be in communication with the inventory management system(s) 310 via the networks 308, or via other network connections. Additionally, the user devices 304 may be part of the distributed system managed by, controlled by, or otherwise part of the inventory management system(s) 310 (e.g., a console device integrated with the inventory management system(s) 310).

In one illustrative configuration, the user devices 304 may include at least one memory 314 and one or more processing units (or processor(s)) 316. The processor(s) 316 may be implemented as appropriate in hardware, computer-executable instructions, firmware, or combinations thereof. Computer-executable instruction or firmware implementations of the processor(s) 316 may include computer-executable or machine-executable instructions written in any suitable programming language to perform the various functions described. The user devices 304 may also include geo-location devices (e.g., a global positioning system (GPS) device or the like) for providing and/or recording geographic location information associated with the user devices 304.

The memory 314 may store program instructions that are loadable and executable on the processor(s) 316, as well as data generated during the execution of these programs. Depending on the configuration and type of user device 304, the memory 314 may be volatile (such as random access memory (RAM)) and/or non-volatile (such as read-only memory (ROM), flash memory, etc.). The user device 304 may also include additional removable storage and/or non-removable storage including, but not limited to, magnetic storage, optical disks, and/or tape storage. The disk drives and their associated computer-readable media may provide non-volatile storage of computer-readable instructions, data structures, program modules, and other data for the computing devices. In some implementations, the memory 314 may include multiple different types of memory, such as static random access memory (SRAM), dynamic random access memory (DRAM), or ROM.

Turning to the contents of the memory 314 in more detail, the memory 314 may include an operating system and one or more application programs or services for implementing the features disclosed herein, such as via the browser application 306 or dedicated applications (e.g., smart phone applications, tablet applications, etc.). The browser application 306 may be configured to receive, store, and/or display a website or other interface for interacting with the inventory management system(s) 310. Additionally, the memory 314 may store access credentials and/or other user information such as, but not limited to, user IDs, passwords, and/or other user information. In some examples, the user information may include information for authenticating an account access request such as, but not limited to, a device ID, a cookie, an IP address, a location, or the like. In addition, the user information may include a user 302 provided response to a security question or a geographic location obtained by the user device 304.

In some aspects, the inventory management system(s) 310 may also be any type of computing devices such as, but not limited to, a mobile phone, a smart phone, a personal digital assistant (PDA), a laptop computer, a desktop computer, a server computer, a thin-client device, a tablet PC, etc. Additionally, it should be noted that in some embodiments, the service provider computers are executed by one more virtual machines implemented in a hosted computing environment. The hosted computing environment may include one or more rapidly provisioned and released computing resources, which computing resources may include computing, networking and/or storage devices. A hosted computing environment may also be referred to as a cloud computing environment. In some examples, the inventory management system(s) 310 may be in communication with the user devices 304 and/or other service providers via the networks 308, or via other network connections. The inventory management system(s) 310 may include one or more servers, perhaps arranged in a cluster, as a server farm, or as individual servers not associated with one another. These servers may be configured to implement the content performance management described herein as part of an integrated, distributed computing environment.

In one illustrative configuration, the inventory management system(s) 310 may include at least one memory 318 and one or more processing units (or processor(s)) 324. The processor(s) 324 may be implemented as appropriate in hardware, computer-executable instructions, firmware, or combinations thereof. Computer-executable instruction or firmware implementations of the processor(s) 324 may include computer-executable or machine-executable instructions written in any suitable programming language to perform the various functions described.

The memory 318 may store program instructions that are loadable and executable on the processor(s) 324, as well as data generated during the execution of these programs. Depending on the configuration and type of inventory management system(s) 310, the memory 318 may be volatile (such as RAM) and/or non-volatile (such as ROM, flash memory, etc.). The inventory management system(s) 310 or servers may also include additional storage 326, which may include removable storage and/or non-removable storage. The additional storage 326 may include, but is not limited to, magnetic storage, optical disks and/or tape storage. The disk drives and their associated computer-readable media may provide non-volatile storage of computer-readable instructions, data structures, program modules and other data for the computing devices. In some implementations, the memory 318 may include multiple different types of memory, such as SRAM, DRAM, or ROM.

The memory 318, the additional storage 326, both removable and non-removable, are all examples of computer-readable storage media. For example, computer-readable storage media may include volatile or non-volatile, removable or non-removable media implemented in any method or technology for storage of information such as computer-readable instructions, data structures, program modules, or other data. The memory 318 and the additional storage 326 are all examples of computer storage media. Additional types of computer storage media that may be present in the inventory management system(s) 310 may include, but are not limited to, PRAM, SRAM, DRAM, RAM, ROM, EEPROM, flash memory or other memory technology, CD-ROM, DVD or other optical storage, magnetic cassettes, magnetic tape, magnetic disk storage or other magnetic storage devices, or any other medium which can be used to store the desired information and which can be accessed by the inventory management system(s) 310. Combinations of any of the above should also be included within the scope of computer-readable media.

Alternatively, computer-readable communication media may include computer-readable instructions, program modules, or other data transmitted within a data signal, such as a carrier wave, or other transmission. However, as used herein, computer-readable storage media does not include computer-readable communication media.

The inventory management system(s) 310 may also contain communications connection(s) 328 that allow the inventory management system(s) 310 to communicate with a stored database, another computing device or server, user terminals and/or other devices on the networks 308. The inventory management system(s) 310 may also include I/O device(s) 330, such as a keyboard, a mouse, a pen, a voice input device, a touch input device, a display, speakers, a printer, etc.

Turning to the contents of the memory 318 in more detail, the memory 318 may include an operating system 332, one or more data stores 334, and/or one or more application programs or services for implementing the features disclosed herein including an input module 336, a demand module 338, a planning horizon module 340, and/or a next quantity module 342. The modules may be software modules, hardware modules, or a combination thereof. If the modules are software modules, the modules will be embodied on a computer readable medium and processed by a processor in any of computer systems described herein.

The input module 336 may be configured to receive any input described throughout the disclosure, including values associated with FIGS. 3-16 and corresponding descriptions. For example, the input module 336 may receive an electronic message from a vendor or supplier of the item to identify the items that may be included in a shipment and/or during a current planning horizon. In another example, the input module 336 may receive input by interacting with a fulfillment center to determine which items are received, an estimated time of arrival (ETA) for items, and the like.

The demand module 338 may be configured to determine a demand realization associated with one or more planning horizons, a forecasted daily demand, leftover demand, unfilled demand, or other demand calculations discussed herein. The demand module 338 may be configured to receive input from the input module 336 in order to calculate the demand and provide the calculated demand(s) in response. The demand module 338 may also be configured to determine an optimization model.

The planning horizon module 340 may be configured to determine a time frame, including a current planning horizon, a next planning horizon, or any other multiple planning horizons. The planning horizons may occur after a current time and may correspond with one or more items that are ordered.

The next quantity module 342 may be configured to estimate and provide a quantity of an item. The quantity may correspond with a future order of an item.

In some examples, the ordering system 350 may also comprise at least one memory and one or more processing units (or processor(s)). The illustration of FIG. 3 has been simplified for ease of explanation. The processor(s) may be implemented as appropriate in hardware, computer-executable instructions, firmware, or combinations thereof. Computer-executable instruction or firmware implementations of the processor(s) may include computer-executable or machine-executable instructions written in any suitable programming language to perform the various functions described.

In some examples, the ordering system 350 (or combined ordering system and inventory management system 360) be configured to generate a quantity order (PO) for one or more item providers (e.g., merchants, third party suppliers, etc.). The PO may identify particular items and quantities to order from the item providers. The PO may be transmitted (e.g., electronically, etc.) to the one or more item providers or suppliers. The one or more item providers or suppliers may process the PO, gather the items identified, and ship the items associated with the PO to a fulfillment center. The items may be shipped directly to another recipient of the items as well (e.g., associated with the inventory management system(s) 310). The fulfillment center and/or recipient may be associated with the inventory management system 310 and/or ordering system 350, or may be separate entities.

As illustrated, the system and method described in at least FIGS. 1-2 may determine the quantity for a planning horizon defined as the time between the current order until the arrival of the next order, and/or the current planning horizon and a next planning horizon. The method may determine the quantity available until the arrival of the next order, which can include the current inventory, the previous incoming orders that have yet to arrive, and the current order.

The calculation may consider a replenishment policy and/or leftover demand. The replenishment policy may affect the calculation of order quantities, which may consider user's order behavior for in-stock and out-of-stock items. Suppose $L = V\,LT_1$ is the lead time of the order that is currently placed, and $U = BP + V\,LT_2$ is the planning horizon, where BP is the ordering period and $V\,LT_2$ is the lead time of the next order. In this example, there may be no outstanding order which will arrive during the planning horizon, in order to simplify the calculations for this example.

Figure 4:
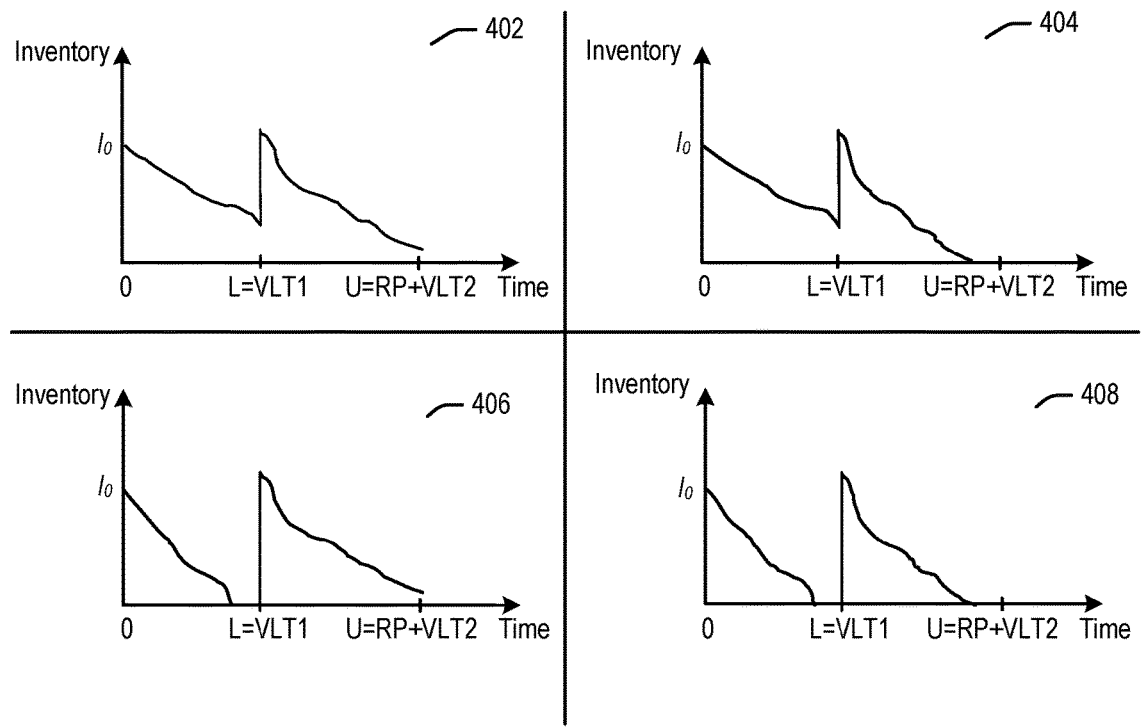
FIG. 4 illustrates four possible demand realizations associated with one or more planning horizon(s) described herein, according to at least one example.

FIG. 4 illustrates four possible demand realizations associated with one or more planning horizon(s). The planning horizon may include a date or time range from the current time until the next order is placed (e.g., not the one placed today, but the order placed next, etc.). The current inventory order may include items that are stored in warehouses, items that are already ordered, and/or items that are being shipped or in transit (e.g., in the pipeline, etc.). In some examples, the planning horizon can account for an expected shortage in the quantity of items available within a current planning horizon, an expected unfulfilled demand during the current planning horizon, and/or an expected leftover demand to be fulfilled on the next planning horizon but unable to be fulfilled during the current planning horizon.

As illustrated in FIG. 4, these charts show the x axis as time and the y axis as inventory. In chart 402, items may be available through current inventory order and the planning horizon, since the item inventory does not reach zero. There may be no items that are out-of-stock and all the demand is satisfied. In chart 404, the current inventory order may satisfy demand, but the out-of-stock behavior may occur near the end of the planning horizon. This may be illustrated when the item inventory reaches zero before the end of the planning horizon. In chart 406, the current inventory order may not satisfy current demand, but demand may be satisfied through the planning horizon. In this instance, the out-of-stock behavior may happen before the current order arrives. In chart 408, the item inventory may be out-of-stock both in the middle of the chart (e.g., current inventory order, etc.) and at the end of the planning horizon. In some examples, the mid-planning horizon out-of-stock may not be affected by our current ordering.

Conventional systems may assume that when item inventory may be out-of-stock near the end of the planning horizon, the result of the out-of-stock at that particular time results in one or more lost sales. In some instances, based at least in part on some replenishment policies, this may not occur. The behavior of demand may affect the one or more replenishment policies. The replenishment of item inventory may be based on a no-recourse policy or a recourse policy.

In some examples, the no-recourse policy can reflect the belief that the mid-planning horizon out-of-stock is backlogged and may be satisfied with the current order (e.g., when the current order arrives to the merchant, etc.). In the no-recourse policy, the unconstrained re-order quantity (hereinafter "ROQ") is obtained by adding the current inventory and the incoming orders, to determine a current supply (hereinafter "$I_{PH}$"), and subtracting the current supply from the target inventory position (hereinafter "TIP").

In some examples, the target inventory position (TIP) may correspond with a quantity for an inventory item that can be ordered and/or stored in an inventory system and/or fulfillment center. For example, the TIP may correspond with a maximum order quantity per item. The Tip may help conserve storage space in the FC for the item and/or balance the space of the item with space allocated for other items. In some examples, the TIP may correspond with an amount of storage space or capacity can be reserved in a fulfillment center, a maximum quantity to order.

In some examples, the recourse policy may reflect the belief that the un-met demand during a period may be (1) lost or (2) the item inventory may be replenished by utilizing an alternate source to satisfy the demand. One example of an alternate source is a "fast emergency" source. The fast emergency source may correspond with positive results (e.g., quickly provide items before the end of a planning horizon, deliver items to an item provider before a standard third party delivery, etc.) and negative results (e.g., high cost, unfavorable shipping methods, etc.).

In conventional systems, ordering may use a critical ratio model (hereinafter "EOM-CR") (e.g., ordering to a percentile in combined demand distribution over vendor lead time, etc.). For example, by setting a critical ratio ("CR") to zero, the items may be ordered (e.g., in association with the vendor lead times, etc.) may be zero. By setting the CR to one, the items may be ordered in association with the highest realization to the highest forecast in a longest planning horizon. In some examples, items may persistently maintain an out-of-stock behavior and increasing critical ratios may not increase order quantities or even decrease them.

In some examples, a recourse policy may not be used for these items, and the system may instead use a no-recourse policy. In some examples, the shift to the no-recourse policy may affect the order quantities (e.g., to inflate the proposed demand more than necessary, to suggest ordering more item inventory than necessary, etc.). In some examples, lead times may be longer (e.g., for items that are imported, for items that take longer to ship and arrive at the item provider, etc.). A possible solution is to manually increase ordering periods to boost the TIPs.

Embodiments of the disclosure may attempt to avoid manually increasing order periods to boost the TIPs and/or may encourage the use of recourse policies (e.g., rather than a no-recourse policy, etc.). The determination of a leftover demand distribution function may be based at least in part on one or more recourse policies discussed herein.

In some examples, the recourse policy may rely on multiple third party sourcing options. The recourse policy may compute the target inventory necessary to cover the demand for the first lead time (hereinafter "TIL") and assumes that the inventory necessary to cover the demand between L and U is TIP-TIL, leading to formula (1).

$$ROQ=TIP-\max(I_{PH}, TIL) \tag{1}$$

Various formulas may be used to determine an expected demand. The following is a list of notations that may be used in these formulas.

GL group level (e.g., cameras and batteries may belong to a GL of electronics, etc.)
BP ordering period
L(V $LT_1$) lead time of the current order that is being placed
V $LT_2$ lead time of the next order that will be placed
U planning horizon (=BP+V $LT_2$)
$c_u$ underage cost per unit
$c_o$ overage cost per unit
$D_{[t_1,t_2]}$ random demand between $t_1$ and $t_2$
$D_1$ random demand between 0 and L, i.e. $D_{[0,L]}$
$D_2$ random demand between L and U, i.e. $D_{[L,U]}$
$I_0$ on-hand inventory and supply arrival during [0, L]
$I_{PH}$ on-hand inventory and supply arrival during the planning horizon [0, U]
$I_{L-PH}$ $I_{PH}-I_0$ (supply arrival during [L, U])
E expectation
$\alpha$ the percentage of the unfilled demand that is backlogged In some examples, an optimization formula may be used. The optimization formula may minimize cost to find the optimal order quantity q that maximizes the profit over period [L, U]. In some examples, the optimization formula may be directed to maximizing the profit rather than minimizing the cost. Without loss of generality, the computer may assume that the supply arrival during period [L, U] is 0. In some examples, if there is a positive supply arrival during period [L, U] (e.g., $I_{L-PH}=I_{PH}-I_0>0$), the supply can be subtracted from the optimal order quantity q*.

$$\min_q E_{L,U,D_1,D_2} \{c_u[D_2 + \alpha(D_1 - I_0)^+ - q - (I_0 - D_1)^+]^+ + \quad (2)$$
$$c_0[q + (I_0 - D_1)^+ - D_2 - \alpha(D_1 - I_0)^+]^+\}$$

where $(I_0-D_1)^+$ represents the inventory position at time L, and $\alpha(I_0-D_1)^+$ is the backlogged unfilled demand. It can be shown that the optimal solution of (2) satisfies the following formula, where CR may correspond with a critical ratio associated with inventory management corresponding to the probability of fulfilling 100% of the demand:

$$P(D_2 + \alpha(D_1 - I_0)^+ - (I_0 - D_1)^+ \le q^*) = \frac{c_u}{c_u + c_0} = CR \quad (3)$$

In some examples, the exact solution of (3) may first determine the joint distribution of $D_1$ and $D_2$. This may be calculated by considering the two extreme cases where (i) $I_0$ is very large (e.g., there is low likelihood of going out of stock) and (ii) $I_0$ is very small (e.g., there is high likelihood of going out of stock).

Case 1: When $I_0$ is large, the problem may be approximated using:

$$P(D_2-(I_0-D_1)\le q^*)=P(D_{[0,U]}\le q^*+I_0)=CR \quad (4)$$

which leads to:

$$q^* = F_{D_{[0,U]}}^{-1}(CR) - I_0 \quad (5)$$

Case 2: When $I_0$ is small, the problem may be approximated using:

$$P(D_2+\alpha(D_1-I_0)q^*)=CR \quad (6)$$

In some examples, the demand forecast may be determined for a consecutive period of time. The calculation may merge $D_2$ and $\alpha D_1$ into a single term and/or approximate $\alpha D_1$ by using the formula: $D_{[(1-\alpha^2)L,L]} + \alpha(1-\alpha)\mu$. This may help preserve the first and the second moments of the term $\alpha D_1$ for any given realization of the lead times, where $\mu$ is the mean of $D_1$. In some examples, this approximation may be used when the demand is relatively stable between 0 and L (e.g., daily demand may correspond with independent and identically distributed (iid) random variables). Therefore:

$$P(D_2 + D_{[(1-\alpha^2)L,L]} + \alpha(1-\alpha)\mu - \alpha I_0 \le q^*) = CR, \quad (7)$$

and thus:

$$q^* = F_{D_{[(1-\alpha^2)L,L]}}^{-1}(CR) + \alpha(1-\alpha)\mu - \alpha I_0 \quad (8)$$

In some examples, when $\alpha=0$ (lost sale), $$q^* = F_{D_{[L,U]}}^{-1}(CR);$$

(CR); when $\alpha=1$ (backlogged), formula (8) may be equivalent to formula (5). Based on the above derivation, the re-order quantity ("ROQ") under the above two extreme cases can be calculated by applying the following formula based on the EOM-TIP model. In some examples, $TIP2(\alpha)$ may be the target inventory position for covering the demand between $(1-\alpha^2)$ L and U. In some examples, let TIP2 denote TIP2(0).

Case 1:

$$ROQ=TIP-I_0.$$

Case 2:

$$ROQ=TIP2(\alpha)+\alpha(1-\alpha)\mu-\alpha I_0$$

Figure 5:
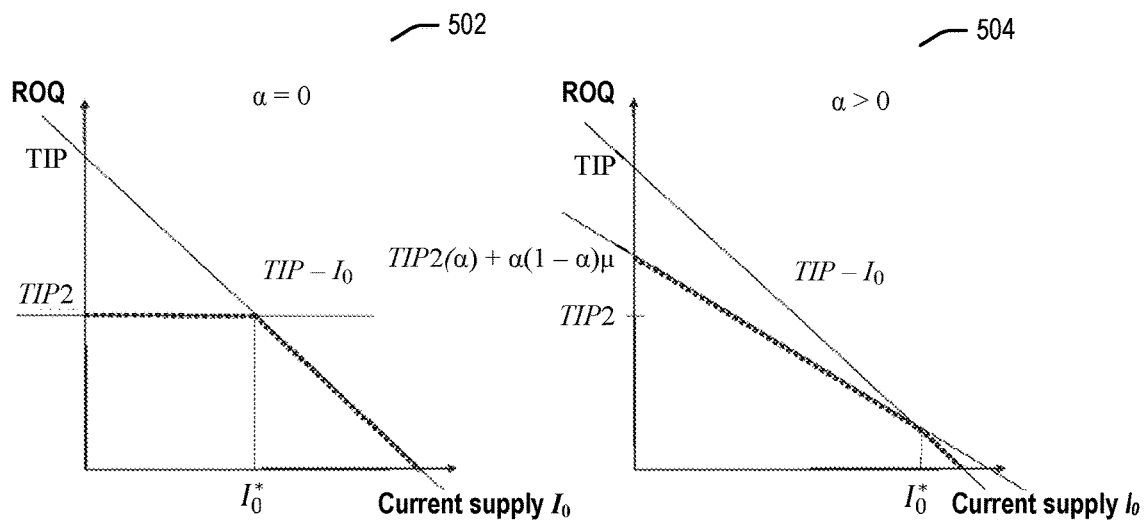
FIG. 5 illustrates charts that describe calculations for determining a next quantity for an item described herein, according to at least one example.

FIG. 5 illustrates example solutions under these two cases. In chart 502, a=0. In chart 504, $\alpha>0$. The two lines $ROQ=TIP-I_0$ and $ROQ=TIP2(\alpha)+\alpha(1-\alpha)\mu-\alpha I_0$ may interact at a cut-off point $I_0^*$ given by:

$$I_0^* = \frac{1}{1-\alpha}\left[F_{D_{[0,U]}}^{-1}(CR) - F_{D_{[(1-\alpha^2)L,U]}}^{-1}(CR) - \alpha(1-\alpha)\mu\right], 0 \le \alpha < 1 \quad (9)$$

In some examples, the ROQ formula may include:

$$ROQ = \begin{cases} TIP2(\alpha) + \alpha(1-\alpha)\mu - \alpha I_0 - I_{L-PH}, & \text{when } I_0 \le I_0^*, \\ TIP - I_0 - I_{L-PH} = TIP - I_{PH} & \text{when } I_0 > I_0^* \end{cases}$$

As a special case, the ROQ formula under the recourse policy (a=0) can be given as $$ROQ = \begin{cases} TIP2 - I_{L-PH}, & \text{when } I_0 \le TIP - TIP2, \\ TIP - I_{PH} & \text{when } I_0 > TIP - TIP2. \end{cases}$$

As illustrated in FIG. 5, an approximate solution of ROQ is illustrated by the dotted lines in each chart 502 and 504. The dotted lines may provide an upper bound for the optimal solution to problem (2). For example, consider any realization r of the random quantity $D_1-I_0$. When $r\ge0$, $$D_2+\alpha(r)^+-(-r)^+=D_2+\alpha r;$$

$$D_2+\alpha(r)^+-(-r)^+\le D_2+r.$$

Similarly, when r<0, $$D_2+\alpha(r)^+-(-r)^+\le D_2+\alpha r;$$

$$D_2+\alpha(r)^+-(-r)^+=D_2+r.$$

For both approximations, the demand service level may be increased, which can lead to an order quantity that is at least as high as the optimal one. Compared with the no-recourse policy ($TIP-I_{PH}$), this recourse policy may provide a more accurate upper bound to the optimal solution. Moreover, the current recourse policy (11) may not necessarily provide a lower or upper bound to the optimal solution, while the new proposed solution does. Consequently, implementing the new solution may allow for systematic diagnosis of the causes of over-ordering or under-ordering when they occur.

The following comparison may illustrate a two-case example of how the order quantities may change by using a proposed recourse procedural or machine learning algorithm. In the two examples, all the parameters may be the same except for the demand probability of $D_1$ and $D_2$.

First, let the current inventory supply $I_0=I_{PH}=10$, and critical ratio CR=70%. Suppose the distribution of demand $D_1$ for period [0, L] and the distribution of demand $D_2$ for period [L, U] are the same, which both can be given by:

$$D_1 = D_2 = \begin{cases} 100 & \text{with probability } 0.5, \\ 0 & \text{with probability } 0.5 \end{cases}$$

Assume $D_1$ and $D_2$ are independent, then the distribution of demand $D_1+D_2$ is given by:

$$D_1 + D_2 = \begin{cases} 200 & \text{with probability } 0.25, \\ 100 & \text{with probability } 0.5, \\ 0 & \text{with probability } 0.25. \end{cases}$$

The solution may satisfy a threshold of 70%:

$$P(D_2-(I_0-D_1)^+ \leq q^*) \geq CR = 70\%$$

In some examples, the smallest order quantity that satisfies the above inequality may be given as $q^*=90$. Since TIP=TIP2=100, $I_0=10$, we have $I_0$>TIP−TIP2, and thus ROQ=TIP−$I_{PH}$=90. Also, ROQ=TIP−max($I_{PH}$,TIL)=100−max(10,100)=0. As such, based on the formula, the previous process under orders by 90 units using the illustrated $ROQ_C$ recourse procedural or machine learning algorithm.

Second, let the current inventory supply $I_0=I_{PH}=10$, and critical ratio CR=70%. Suppose the distribution of demand $D_1$ for period [0, L] and the distribution of demand $D_2$ for period [L, U] may be the same, which both can be given by:

$$D_1 = D_2 = \begin{cases} 100 & \text{with probability } 0.2, \\ 0 & \text{with probability } 0.8 \end{cases}$$

Assume $D_1$ and $D_2$ are independent, then the distribution of demand $D_1+D_2$ is given by:

$$D_1 + D_2 = \begin{cases} 200 & \text{with probability } 0.04, \\ 100 & \text{with probability } 0.32, \\ 0 & \text{with probability } 0.64. \end{cases}$$

The solution may satisfy a threshold of 70%:

$$P(D_2-(I_0-D_1)^+ \leq q^*) \geq CR = 70\%$$

In some examples, the smallest order quantity that satisfies the above inequality can be given as $q^*=0$. Since TIP=100, TIP2=0, $I_0=10$, we have $I_0$<TIP−TIP2, and thus ROQ=TIP2−($I_{PH}-I_0$)=0. Also, ROQ=TIP−max($I_{PH}$,TIL)= 100−max(10, 0)=90. As such, based on the formula, the previous process over orders by 90 units using the illustrated $ROQ_C$ recourse procedural or machine learning algorithm.

In some examples, the formulas may consider balancing item inventory at a national level. For example, consider the example below with 2 entities (e.g., fulfillment centers, item provider locations, etc.) (hereinafter "FC1" and "FC2"). In FC1, since $I_0$>TIP−TIP2, the unconstrained $ROQ^{FC1}$=TIP−$I_{PH}$=100−80=20, and in FC2, since $I_0$<TIP−TIP2, the unconstrained $ROQ^{FC2}$=TIP2−$I_{L\text{-}PH}$=35−30=5. The last row provides a combination of the values of every input. Since $I_0$<TIP−TIP2, the unconstrained $ROQ^{sum}$=TIP2−$I_{L\text{-}PH}$=95−60=35 does not match the sum of UROQs in the first two FCs. This may be due to imbalanced FCs based at least in part on the recourse policy (e.g., fall into different sides of a switch point ($I_0$=TIP−TIP2)).

|  | TIP | TIP2 | $I_0$ | $I_{L\text{-}PH}$ | $I_{PH}$ | Output: UROQ |
| --- | --- | --- | --- | --- | --- | --- |
| FC1 | 100 | 60 | 50 | 30 | 80 | 20 |
| FC2 | 100 | 35 | 50 | 30 | 80 | 5 |
| sum | 200 | 95 | 100 | 60 | 160 | 35 |

To resolve this issue, the formula(s) may consider national balancing, as illustrated:

$$ROQ=TIP-I_{PH}-NB(TIP-TIP2-I_0)$$

where NB is a national balancing function.

National balancing may represent a virtual transfer of inventory. For example, a quantity of an item in an FC that is virtually or physically moved to another FC based at least in part to ensure that the item is available in multiple locations. For example, if FC1 has 1 item but should have 3 items and FC2 has 3 items but only needs one item, through virtual accounting, the national balancing may reposition FC1 with 3 items and FC2 with 1 item, even though no units were actually moved. In another example, a user may order the item from geography A (e.g., New York, etc.) and 10 units of the item is available only in geography B (e.g., Washington, etc.). The national balancing process may ship some of the items from geography B to geography A before the user orders the item to help ensure that the user can receive the item quickly in their geography, rather than waiting for the delivery from geography A.

Following this method, in the example above, the order quantity in FC1 is 100−80−NB(100−60−50)=100−80−NB(−10)=20, and the order quantity in FC2 is 100−80−NB(100−35−50)=100−80−NB(15)=100−80−5=15. Therefore, we have $ROQ^{FC1}+ROQ^{FC1}=35=ROQ^{sum}$.

The solution $q^*$ of a proposed ROQ model may satisfy:

$$P(D_2-(I_0-D_1)^+ \leq q^*) = CR. \quad (10)$$

For example, D1 and D2 may be assumed to be independent and follow exponential distributions with mean $$\mu_1 = \frac{1}{\lambda_1}$$

and $$\mu_2 = \frac{1}{\lambda_2}$$

respectively. Therefore, q* may satisfy:

$$P(D_1 \leq I_0, D_1+D_2 \leq I_0+q)+P(D_1 > I_0)P(D_2 \leq q)=CR,$$

and thus:

$$1 - e^{-\lambda_1 I_0} + \frac{\lambda_1}{\lambda_2 - \lambda_1}(e^{-\lambda_2(I_0+q)} - e^{-\lambda_2 q - \lambda_1 I_0}) + e^{-\lambda_1 I_0}(1 - e^{-\lambda_2 q}) = CR$$

Various ROQ formulas may be used. Two example ROQ formulas are provided:

$$ROQ_c = TIP - \max(I_{PH}, TIL) \quad (11)$$

$$ROQ_n = \begin{cases} TIP2 - I_{L-PH}, & \text{when } I_0 \leq TIP - TIP2, \\ TIP - I_{PH} & \text{when } I_0 > TIP - TIP2 \end{cases} \quad (12)$$

where the recourse point of $ROQ_c$ or $RP_c$ is $I_{PH}$=TIL, and the recourse point of $ROQ_n$ or $RP_n$ is $I_0$=TIP-TIP2.

Figure 6:
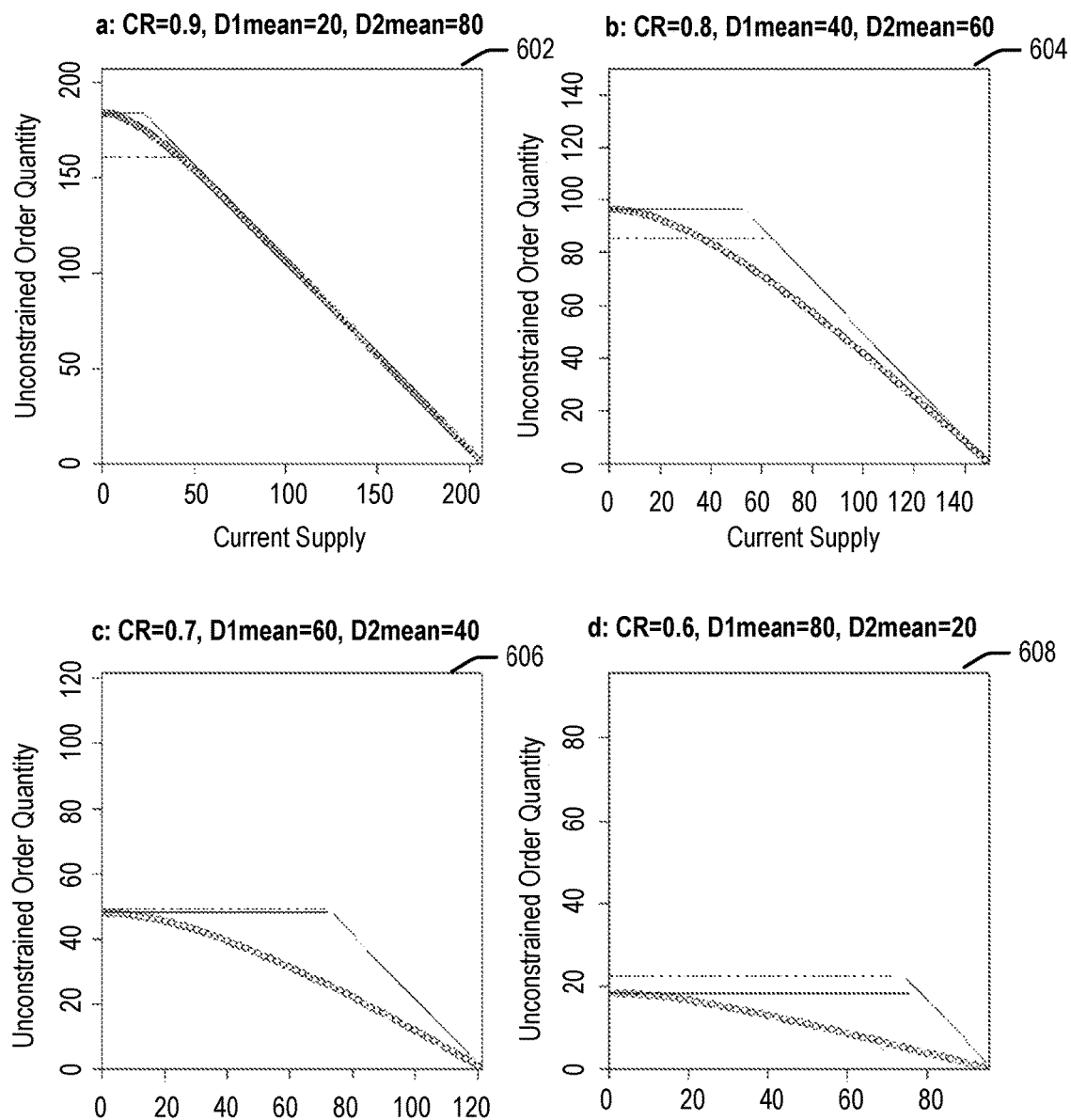
FIG. 6 illustrates a comparison of re-order quantity formulas $ROQ_n$ and $ROQ_C$ under one or more potential recourse policies described herein, according to at least one example.

FIG. 6 illustrates a comparison of $ROQ_n$ and $ROQ_c$ under a potential recourse policy. Four scenarios with different CR and mean of demand are illustrated, including chart 602, chart 604, chart 606, and chart 608. The dotted curves can represent the optimal solutions, the solid lines can represent $ROQ_n$, and the dashed lines can represent $ROQ_c$. When the current supply exceeds max{$RP_c$, $RP_n$}, then $ROQ_c$=$ROQ_n$=TIP-$I_{PH}$.

Table 2 reports the order quantity increase by using the new ROQ formula when supply is smaller than $RP_c$ and $RP_n$. In some examples, as CR becomes larger, $ROQ_n$ increases more than $ROQ_c$ does. This is because TIP, TIL, and TIP2 may all increase as CR goes up, but TIP-TIL may not increase as fast as TIP2 or may even decrease. In some examples, when CR=0.9 and 0.8, then TIP2/(TIP-TIL) may increase when $\mu_1/\mu_2$ gets larger (e.g., with longer lead times, etc.).

In some examples, TIP2 may be calculated using two random lead times, whereas TIP may not be calculated using lead time sampling. Since the demand distribution may vary for two different time intervals even if they have the same length, the calculation of a realization may consider both U-L and U (or L) in order to determine the demand distribution.

As an input, quantiles may be provided for each lead time distribution (e.g., p2, p4, p6, etc.). The following method (e.g., procedural or machine learning "algorithm 1") may determine a subset and extrapolate the results from this method to estimate all realizations. In some examples, all values may be determined, rather than a subset, to determine sample data in order to solve the EOM-TIP model to obtain TIP2.

1. Input: Sample size S, and a list of quantiles for the distributions of L and U respectively, denoted by $P_L$ and $P^U$.
2. Separate the data points associated with U into groups (e.g., bucketizing the quantiles to integer values, etc.). In each group, U may be associated with an integer value $u_k$ associated with some probability $p_k$. If U has K groups, then $$\sum_{k=1}^{K} p_k = 1.$$

3. In some examples, the method may use a Quasi Monte Carlo Method. For example, for each group k, pick a van der Corput sequence consisting of $P_k S$ points between 0.01 and 0.99. In some examples, a van der Corput sequence may include a low discrepancy sequence consisting of 0.5, 0.25, 0.75, 0.125, 0.625, 0.375, etc. The output may include the corresponding quantiles of distribution L, denoted by $l_{kj}$. In some examples, if $P_k S$ is larger than the number of available quantiles, the method may use all the available quan-

TABLE 2

Order Quantity Increase using the new ROQ when supply is smaller than $RP_c$ and $RP_n$

| | $\mu_1 = 20, \mu_2 = 80$ | $\mu_1 = 40, \mu_2 = 60$ | $\mu_1 = 60, \mu_2 = 40$ | $\mu_1 = 80, \mu_2 = 20$ |
|---|---|---|---|---|
| CR = 0.9 | 14.27% | 33.40% | 60.17% | 100.43% |
| CR = 0.8 | 7.78% | 13.11% | 21.05% | 40.00% |
| CR = 0.7 | 1.37% | -1.63% | -2.23% | 5.70% |
| CR = 0.6 | -5.30% | -13.79% | -19.34% | -18.67% |

The methods may consider lead time sampling. For example, a lead time may correspond with an amount of time it takes between ordering an item and receiving the item at a storage facility. In some examples, this lead time may affect the supply distribution function. As such, lead time sampling may consider more than one source or instance of the lead time data, including historical, estimated, or current data about the lead time. The data may be used to help create the supply distribution function or an expected lead time.

tiles. In some examples, the method may obtain at most S sample points of (L, U).

4. Post processing. The distribution $l_{kj}$ may be grouped into integer numbers. The method may obtain a set of points $[l_i, u_i]$, and in some instances, one or more of these points may be associated with some probability $p_i^{L,U}$.

Figure 7:
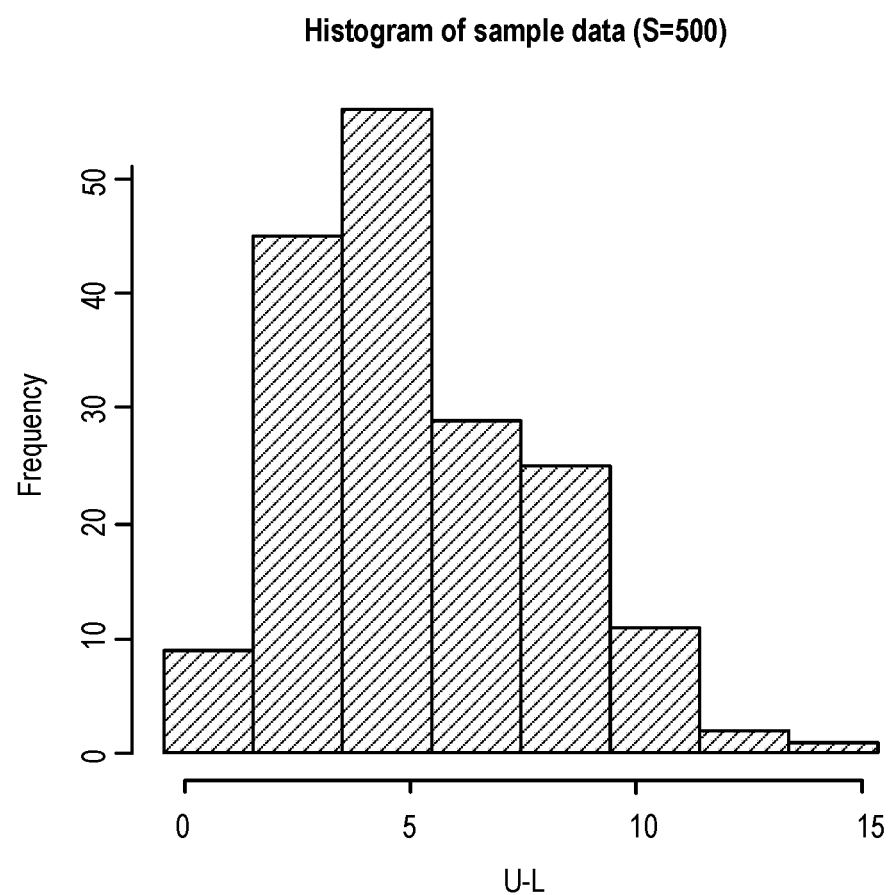
FIG. 7 illustrates an example histogram of this method using sample data for a particular item described herein, according to at least one example.

FIG. 7 illustrates an example histogram of this method using sample data for a particular item. For example, item XYZ, the quantiles of the V $LT_1$ can include:

| vendor | FC | p10 | p20 | p30 | p40 | p50 | p60 | p70 | p80 | p90 |
|---|---|---|---|---|---|---|---|---|---|---|
| ABC1 | PHX7 | 11.0 | 13.73 | 14.55 | 14.95 | 15.25 | 15.56 | 15.92 | 16.41 | 17.26 |

V LT$_2$ associated with the next order on May 26 (ordering period=7 days) can include:

| Vendor | FC | p10 | p20 | p30 | p40 | p50 | p60 | p70 | p80 | p90 |
|---|---|---|---|---|---|---|---|---|---|---|
| ABC2 | PHX7 | 11.01 | 11.18 | 11.32 | 11.44 | 11.58 | 12.72 | 12.90 | 13.13 | 13.71 |

In an example illustration where the sample size S=9, the following steps may illustrate how to construct the sample. Various numbers of quantiles may be used. As illustrated with FIG. 7, 49 quantiles (e.g., p2, p4, etc.) are used for both lead times as input data, and sample U−L with S=500:
- Step 1. Group U=RP+V LT$_2$ to integer values 18, 19, 20, 21. We have 4 groups (e.g., buckets, etc.), each associated with probability 4/9, 1/9, 3/9, and 1/9, Respectively.
- Step 2. By picking 4, 1, 3, 1 data points from the quantiles of distribution L for each group respectively:
  (l,u)=(15.25, 18) (14.55, 18) (16.41, 18), (13.73, 18)
  (15.25, 19)
  (15.25, 20) (14.55, 20) (16.41, 20)
  (15.25, 21)
- Step 3. Round the numbers to integers and associate them with probabilities.

| l | u | Prob. |
|---|---|---|
| 14 | 18 | 1/9 |
| 15 | 18 | 2/9 |
| 16 | 18 | 1/9 |
| 15 | 19 | 1/9 |
| 15 | 20 | 2/9 |
| 16 | 20 | 1/9 |
| 15 | 21 | 1/9 |

Figure 8:
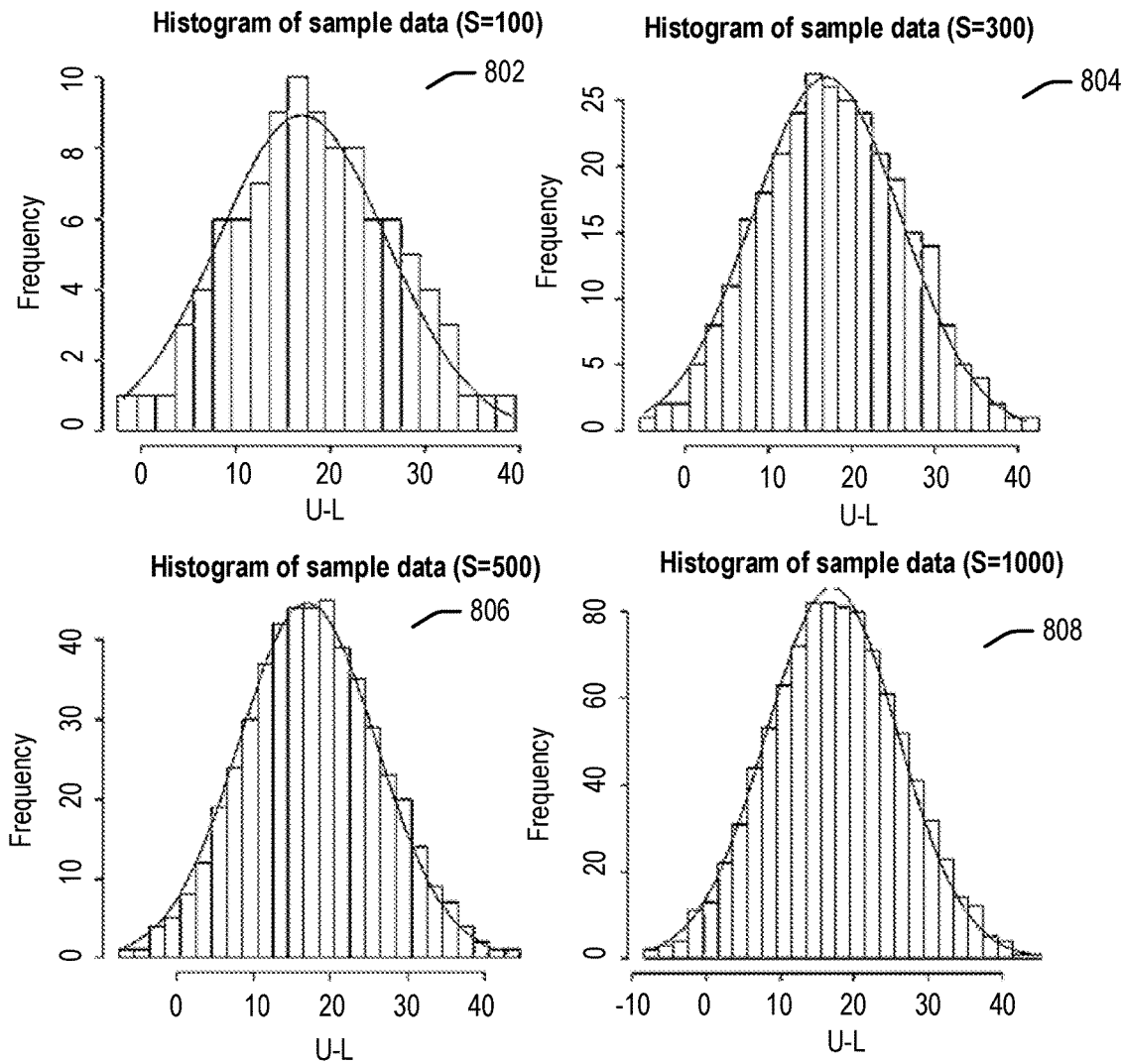
FIGS. 8-9 illustrate a comparison of sample data $\mu_i$-$l_i$ and the density function of U-L described herein, according to at least one example.
Figure 9:
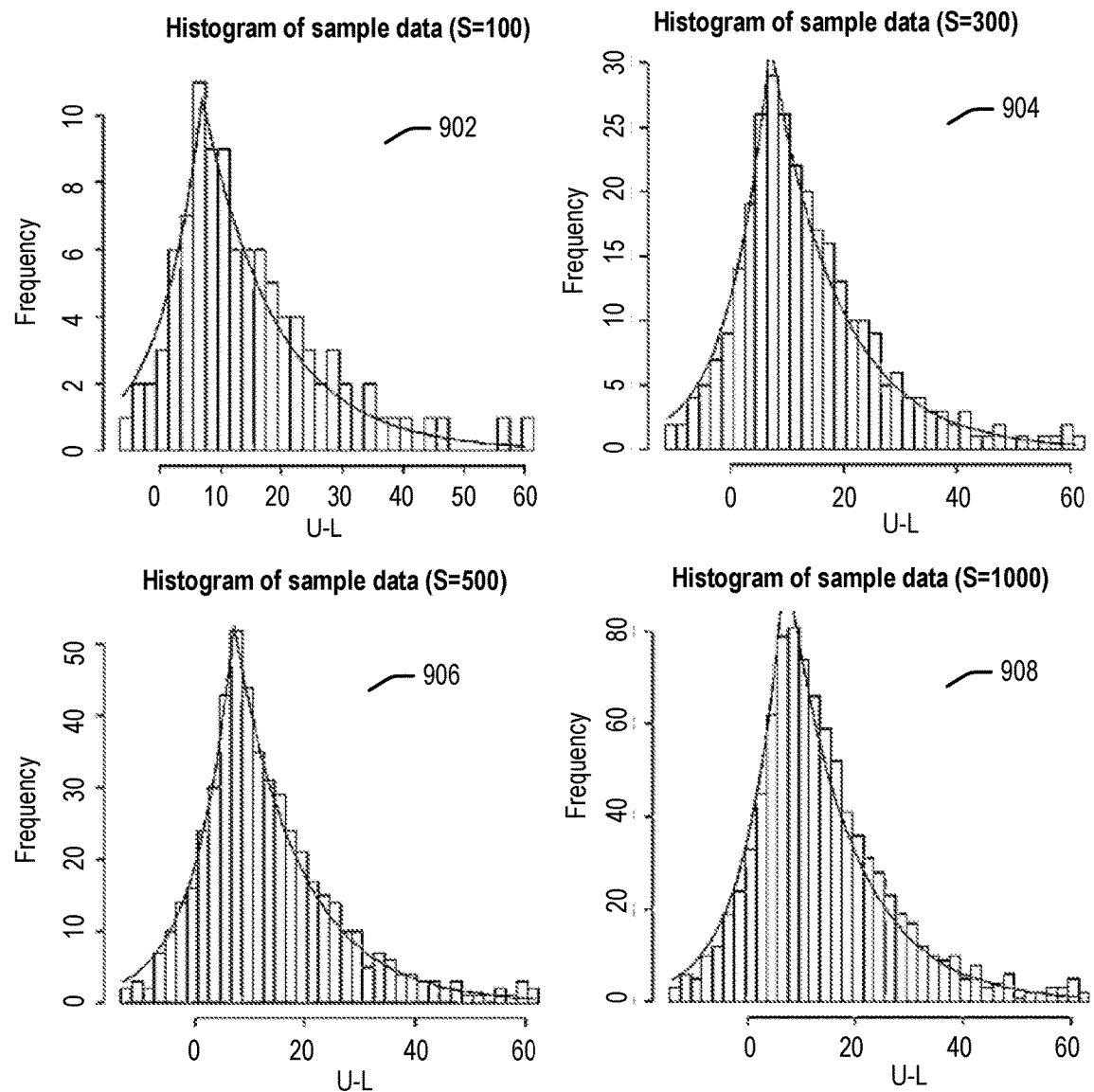

FIGS. 8 and 9 illustrate a comparison of sample data $\mu_i - l_i$ and the density function of U−L. In FIG. 8, chart 802 illustrates a sample size 100, chart 804 illustrates a sample size 300, chart 806 illustrates a sample size 500, and chart 808 illustrates a sample size 1000 for a normal distribution. In FIG. 9, chart 902 illustrates a sample size 100, chart 904 illustrates a sample size 300, chart 906 illustrates a sample size 500, and chart 908 illustrates a sample size 1000 for an exponential distribution. The charts illustrate experiments when different lead times U−L follow some known distribution.

A normal distribution may be determined based at least in part on the charts in FIG. 8. For example, assume the first vendor lead time V LT$_1$ follows a normal distribution with mean 10 days and standard deviation 4 days, the second vendor lead time V LT$_2$ follows a normal distribution with mean 20 days and standard deviation 8 days. The review period may be 7 days. Then U−L=(RP+VLT$_2$−V LT$_1$) has a normal distribution with mean 17 days and standard deviation $\sqrt{4^2+8^2}=\sqrt{80}$ days. FIG. 8 compares the histogram of sample data $u_i - l_i$ and the density function of U−L.

Exponential distribution may be determined based at least in part on the charts in FIG. 9. For example, assume the first vendor lead time V LT$_1$ follows an exponential distribution with mean $$\frac{1}{\lambda_1} = 7$$

days, and the second vendor lead time V LT$_2$ follows an exponential distribution with mean $$\frac{1}{\lambda_2}$$

12 days. The review period may be 7 days. Then V LT$_2$−V LT$_1$ has a distribution with the density function given by:

$$f(z) = \begin{cases} \frac{\lambda_1 \lambda_2}{\lambda_1 + \lambda_2} e^{-\lambda_2 z}, & \text{when } z \geq 0, \\ \frac{\lambda_1 \lambda_2}{\lambda_1 + \lambda_2} e^{\lambda_1 z}, & \text{when } z < 0. \end{cases}$$

Various methods have been discussed to generate samples of random variables. In some examples, a deterministic way of simulating the coupled vendor lead times can be illustrated and calculated, as shown with sample data in FIGS. 10 and 11.

Figure 10:
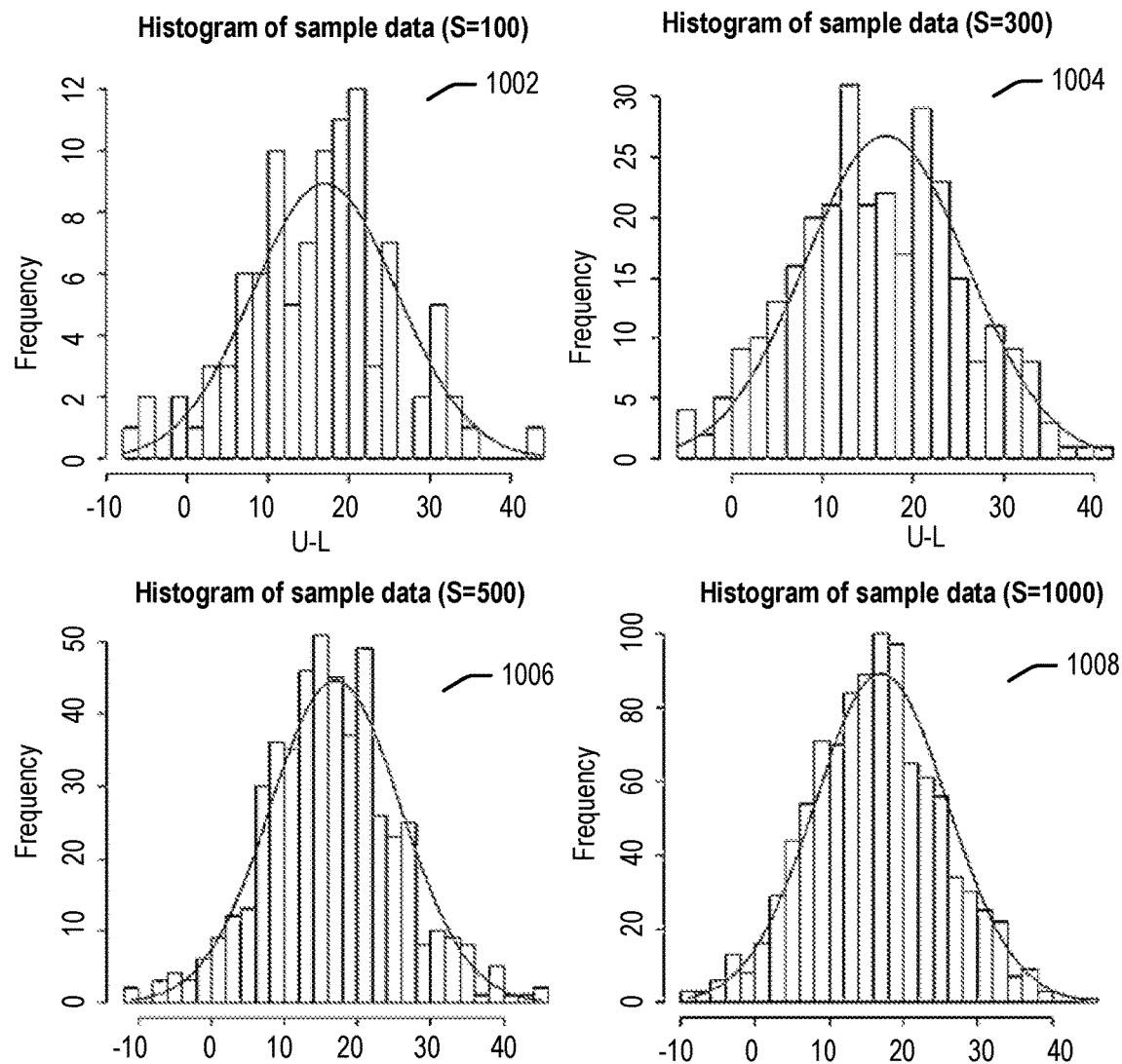
FIGS. 10-11 illustrate a comparison of sample data $\mu_i$-$l_i$ and the density function of U-L described herein, according to at least one example.
Figure 11:
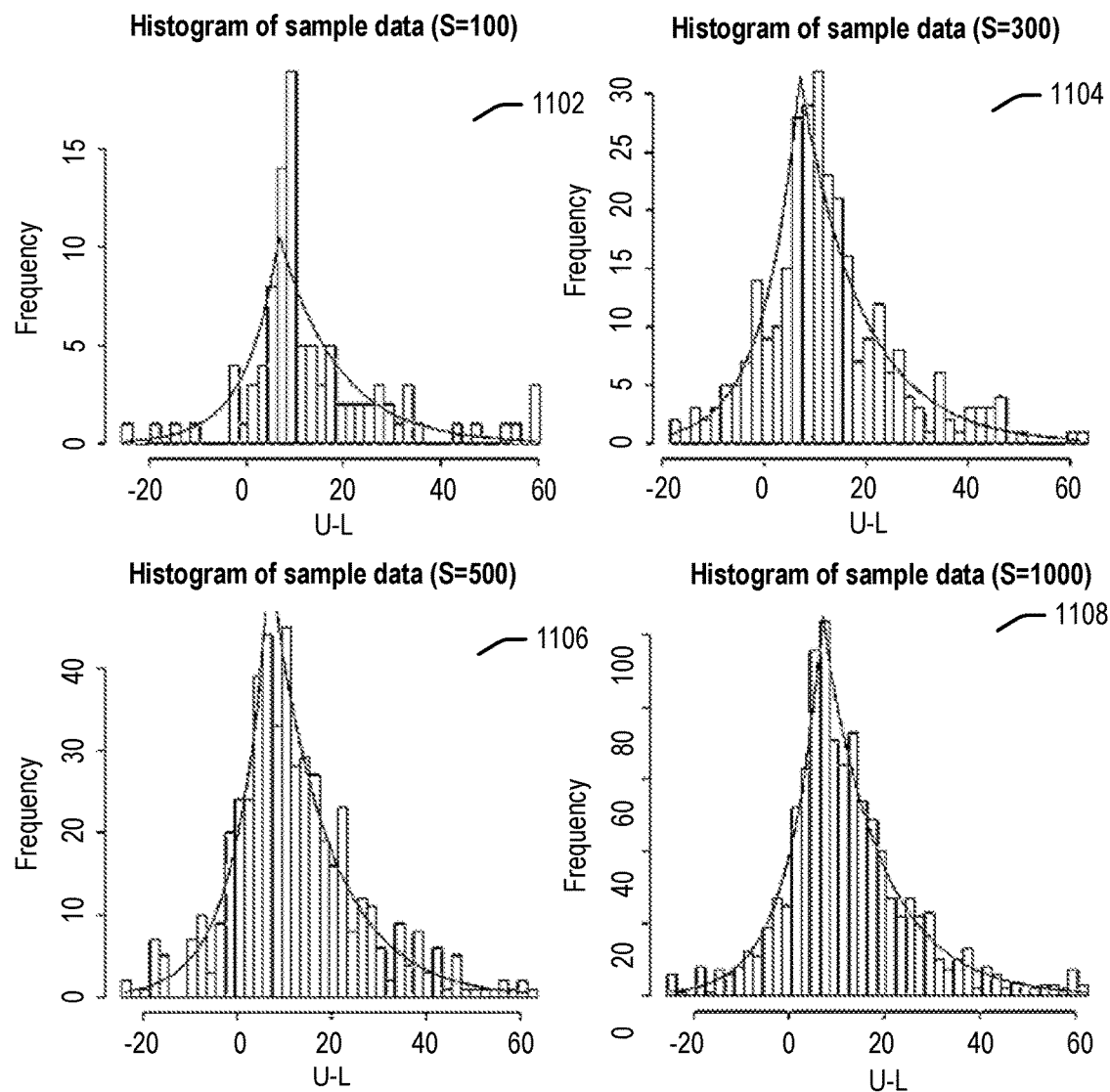

FIGS. 10 and 11 illustrate a comparison of sample data $\mu_i - l_i$ and the density function of U−L for the cases of normal and exponential distributions, but with using a different method to calculate the values. In FIG. 10, chart 1002 illustrates a sample size 100, chart 1004 illustrates a sample size 300, chart 1006 illustrates a sample size 500, and chart 1008 illustrates a sample size 1000 for a normal distribution. In FIG. 11, chart 1102 illustrates a sample size 100, chart 1104 illustrates a sample size 300, chart 1106 illustrates a sample size 500, and chart 1108 illustrates a sample size 1000 for an exponential distribution. These charts may be generated using an alternative algorithm (e.g., procedural or machine learning "algorithm 2").

1. Input: Sample size S, and a list of quantiles for the distributions of L and U respectively, denoted by $P^L$ and $P^U$.
2. Separate the data points into groups (e.g., bucketizing the quantiles to integer values, etc.). In each group, U has an integer value $a_m$ associated with some probability $p_m^U$ and L has an integer value $b_n$ associated with some probability $p_n^L$. If U has M groups and L has N groups, then $$\sum_{k=1}^{M} p_k^U = 1$$

and $$\sum_{k=1}^{N} p_k^L = 1.$$

3. Randomly sample 2S points in range [0, 1] with uniform distribution, $s_1, s_2, \ldots, s_{2S}$.

4. Mapping:

For $1 \leq i \leq S$, if $\sum_{k=0}^{m} p_k^U \leq s_i < \sum_{k=0}^{m+1} p_k^U$, then $u_i = a_{m+1}$.

For $S < i \leq 2S$, if $\sum_{k=0}^{n} p_k^L \leq s_i < \sum_{k=0}^{n+1} p_k^L$, then $l_i = b_{n+1}$.

5. Output: S sample points of random variables L and U: $[l_i, u_i]$.

In some examples, when the sample size is small, the histogram of sample data generated by algorithm 1, as illustrated with FIGS. 8-9, may describe the density distribution in a more accurate method than the histogram generated by algorithm 2, as illustrated by FIGS. 10-11. In some examples, algorithm 1 (e.g., the deterministic method) may be used more often than and/or be preferred to algorithm 2.

Figure 12:
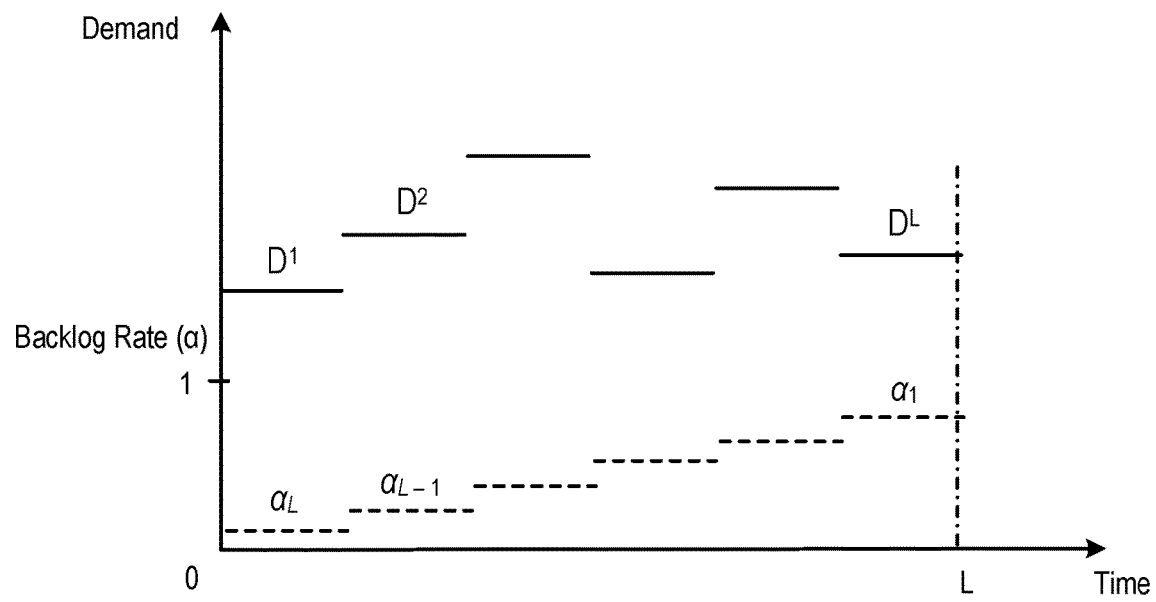
FIG. 12 illustrates a sample of estimating attrition rates described herein, according to at least one example.

FIG. 12 illustrates a sample of estimating attrition rates. For example, item inventory for a particular item may be out-of-stock before the current order arrives. When it happens, some of the unfilled demand is lost while some of the demand will return when the item inventory is replenished (e.g., backlogged, etc.). Parameter α can represent the percentage of unfilled demand that is backlogged. For example, the attrition rate of unfilled demand is independent of the time to be in-stock. However, the attrition rate may actually vary depending upon the number of days for which the item inventory is out-of-stock, resulting in a dynamic attrition rate during the out-of-stock period.

In a sample illustration, assume $1-\alpha_k$ is the attrition rate of unfilled demand if it takes k days to be in-stock. Then we have $\alpha_0=1$ and $\alpha_1 > \alpha_2 > \ldots > \alpha_L$ where L is the lead time of the current order. Let $D^1, D^2, \ldots, D^L$ be the daily demand of days $1, 2, \ldots, L$ respectively during the lead time period, and $D_1 = D^1 + D^2 + \ldots + D^L$ is the total demand from 0 to L.

The backlogged demand B before the current order arrives can include:

$$\mathcal{B} = \mathbb{P}(I_0 \leq 0) \sum_{k=1}^{L} \alpha_k D^{L-k+1} + \mathbb{P}(0 < I_0 \leq D^1) \sum_{k=1}^{L-1} \alpha_k D^{L-k+1} +$$

$$\mathbb{P}(D^1 < I_0 \leq D^1 + D^2) \sum_{k=1}^{L-2} \alpha_k D^{L-k+1} + \ldots +$$

$$\mathbb{P}\left(\sum_{k=1}^{L-2} D^k < I_0 \leq \sum_{k=1}^{L-1} D^k\right) \sum_{k=1}^{1} \alpha_k D^{L-k+1}$$

$$= \sum_{k=1}^{L} \alpha_k D^{L-k+1} \mathbb{P}\left(I_0 \leq \sum_{j=1}^{L-k} D^j\right)$$

In some examples, let:

$$\beta_k = \alpha_k \mathbb{P}\left(I_0 \leq \sum_{j=1}^{L-k} D^j\right) = \alpha_k \mathbb{P}(I_0 \leq D_{[0,L-k]}), \forall k \in \{1, 2, \ldots, L\},$$

In some examples, the computer may stipulate that $$\sum_{j=1}^{0} D^j = 0.$$

The result of this formula can determine the backlogged demand:

$$\mathcal{B} = \sum_{k=1}^{L} \beta_k D^{L-k+1} \qquad (13)$$

Now using formula (6) (e.g., when $I_0$ is small), the problem can be approximated using:

$$\mathbb{P}(D_2 + B \leq q^*) = CR \qquad (14)$$

In some examples, $D_2$ and B can be merged into a single term. This may help determine the demand forecast for a consecutive period. B can be approximated using:

$$D_{[L-\sum_{k=1}^{L} \beta_k^2, U]} + \left(\sum_{k=1}^{L} \beta_k - \sum_{k=1}^{L} \beta_k^2\right) \frac{\mu}{L}$$

This formula may preserve the first and the second moments of B for any given realization of the lead times, where μ is the mean of $D_1$. In some examples, this approximation may be used when the demand is stable between 0 and L (e.g., daily demand is iid random variables). For example, assume the daily demand between 0 and L is iid random variables, and μ and $\sigma^2$ are the mean and variance of $D_1$, then the mean of $D_{[(1-\alpha^2)L,L]} + \alpha(1-\alpha)\mu$ may be:

$$\alpha^2 L \frac{\mu}{L} + \alpha(1-\alpha)\mu = \alpha\mu$$

and the variance of $D_{[(1-\alpha^2)L,L]} + \alpha(1-\alpha)\mu$ may be:

$$\alpha^2 L \frac{\sigma^2}{L} + \alpha^2 \sigma^2$$

In some examples, the formula(s) may be the same as the mean and the variance of $\alpha D_1$.

As such, in some examples, the optimal solution q* satisfies:

$$\mathbb{P}\left(D_{[L-\sum_{k=1}^{L} \beta_k^2, U]} + \left(\sum_{k=1}^{L} \beta_k - \sum_{k=1}^{L} \beta_k^2\right) \frac{\mu}{L} \leq q^*\right) = CR \qquad (15)$$

Additional methods may be used to calculate estimated demand as well. For example, consider the following example. Suppose $(1-\alpha_1)$ and $(1-\alpha_2)$ are the attrition rates of unfilled demand if it takes 1 and 2 days to be in-stock respectively, and all the unfilled demand is lost if the time to be in-stock is larger than 2 days. Then:

$$\beta_1 = \alpha_1 \mathbb{P}(I_0 \leq D_{[0,L-1]}) \qquad (16)$$

$$\beta_2 = \alpha_2 \mathbb{P}(I_0 \leq D_{[0,L-2]}) \qquad (17)$$

where $\mathbb{P}(I_0 < D_{[0,L-1]})$ and $\mathbb{P}(I_0 < D_{[0,L-2]})$ can be obtained based on the quantiles of demand distributions from 0 to L−1, and from 0 to L−2 respectively. According to (15), the optimal solution q* may satisfy:

$$\mathbb{P}(D_{[L-\beta_1^2-\beta_2^2,U]} + (\beta_1+\beta_2-\beta_1^2-\beta_2^2)\mu \text{ daily demand} \leq q^*) = CR, \quad (18)$$

and thus:

$$q^* = F^{-1}_{D_{[L-\beta_1^2-\beta_2^2,U]}}(CR) + (\beta_1+\beta_2-\beta_1^2-\beta_2^2)\mu \text{ daily demand} \quad (19)$$

Next, several special or extreme cases may be considered as well. For example, in an example of lost sale $(\alpha_1=\alpha_2=\ldots=\alpha_L=0)$:

$$q^* = F^{-1}_{D_{[L,U]}}(CR) = TIP2 \quad (20)$$

In an example of backlog $(\alpha_1=\alpha_2=\ldots=\alpha_L=1)$ and $I_0=0$:

$$q^* = F^{-1}_{D_{[0,U]}}(CR) = TIP \quad (21)$$

In an example of constant attrition rate $(\alpha_1=\alpha_2=\ldots=\alpha_L=\alpha)$ and $I_0=0$:

$$q^* = F^{-1}_{D_{[(1-\alpha^2)L,U]}}(CR) + \alpha(1-\alpha)\mu \quad (22)$$

In some examples, one way of calculating the re-order quantity in the recourse policy is to first compute the expected supply at the end of the first lead time L, and then subtract it from TIP2. This may not generate correct re-order quantities, in some instances.

The model may make some assumptions. For example, both the first lead time L and the planning horizon U may be assumed to be deterministic. In some examples, no incoming quantity order may be received during the planning horizon. In some examples, the current on-hand inventory $I_0$ may equal 50. In some examples, the demand for the first lead time period [0, L] may follow a two-point distribution ($D_1=0$ with probability 70% and $D_1=100$ with probability 30%). In some examples, the demand from the first lead time L to the planning horizon U may be deterministic ($D_2=20$) as well.

In some examples, the service level may be determined by CR=0.8. As such, TIP=120 and TIP2=20. For example, since I=50<(TIP−TIP2), according to at least one of the recourse formulas, the order quantity is TIP2=20. Additionally, the expected supply at the end of the first lead time may be $I-E[D_1]=50-30=20$, which may lead to an order quantity of TIP2−20=0.

In examples where a service level is maintained at 80%, the item inventory may decrease to zero before the current order arrives. Thus, instead of ordering 0 units, ROQ may equal the deterministic demand $D_2=20$.

Alternative solutions may be illustrated as well. For example, the following notation and assumptions may be used:

L: Vendor Lead Time with distribution at time t for an item. The notation to show that lead time depends on a type of item, location where the item is stored (e.g., fulfillment center, item provider location, etc.), and a time may be suppressed for simplicity of illustration
RP: Review Period
PH: Planning Horizon (e.g., in some examples: RP+L)
$D[t_0, t_1]$: Random demand over the interval $[t_0, t_1]$
$PO_i$: Size of the i-th incoming PO
$T_i$: Random variable depicting the arrival time of the i-th incoming PO In some examples, a single quantity order (PO) may be considered where the arrival time may be given by the random variable T. If the PO arrives before the next regular order (e.g., before RP+L), the order can be used to satisfy the demand from T to RP+L. The items received from the order can be counted as item inventory supply, at most up to D(T, RP+L). This observation can be expressed for the expected supply:

$$\mathbb{E}[S] := \mathbb{E}_{D,L,T}[\min\{PO1_{\{T \leq RP+L\}}, D(T,RP+L)\}] = \mathbb{E}_D[\mathbb{E}_{D|T,L}[\min\{PO1_{\{t \leq RP+l\}}, D(t,RP+l)\}|T=t, L=l]]$$

This expectation can yield a closed form expression for what may be counted as supply for the planning horizon. In some examples, implementing this computation may be computationally demanding.

Figure 13:
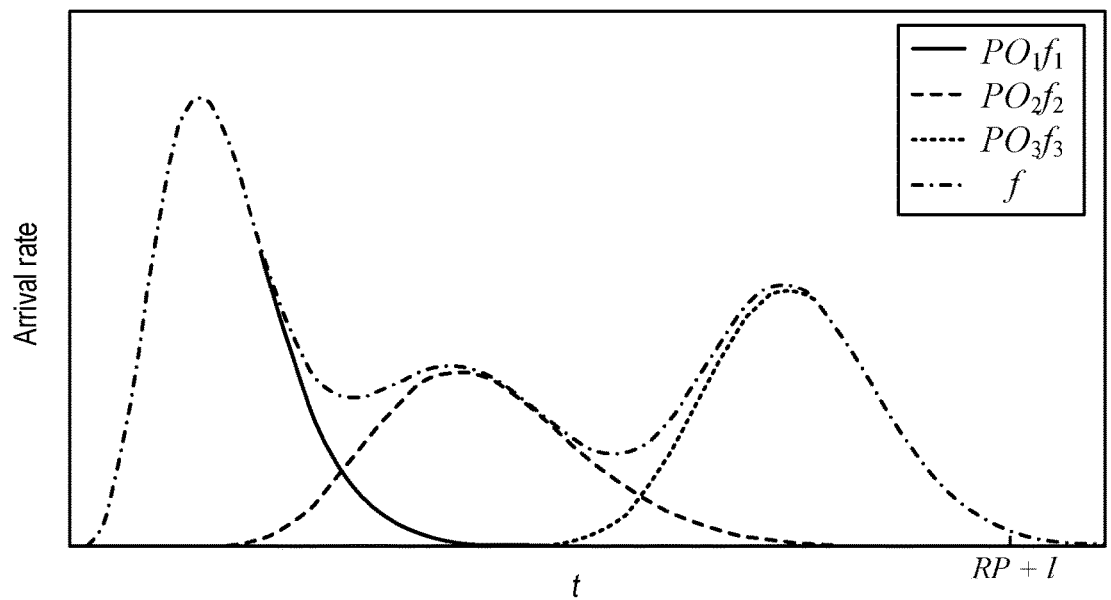
FIG. 13 illustrates an example next quantity calculation with multiple outstanding quantity orders (PO) described herein, according to at least one example.

FIG. 13 illustrates an example next quantity calculation with multiple outstanding quantity orders (PO). In this illustration, several of the POs may arrive during the planning horizon. The POs may be labeled with the subscript i=1, . . . , n, so that $PO_i$ arrives at time $T_i$. Deriving an expression for the expected supply may be more intricate (e.g., to keep track of the order of arrivals, etc.).

To illustrate the multiple POs case, consider only two POs: $PO_1$ and $PO_2$. $PO^1$ may define the first of the two to arrive and $PO^2$ may define the second one. Note that the size of $PO^j$ (j=1, 2) may also be a random variable, since in some examples, either one of the two POs may arrive first. The expected supply may be the sum of the expected supplies $\mathbb{E}[S_1]$ and $\mathbb{E}[S_2]$ contributed by $PO_1$ and $PO_2$, respectively. $\mathbb{E}[S_1]$ may be given by a formula similar to the one derived for the case of the single PO:

$$\mathbb{E}[S_1] = \mathbb{E}_{D,PO^1,T^1,L}[\min\{PO^1 1_{\{T^1 \leq RP+L\}}, D(T^1,RP+L)\}]$$

The expected supply contributed by the second PO to arrive may be given by:

$$\mathbb{E}[S_2] = \mathbb{E}[\min\{PO^2 1_{\{T^2 \leq RP+L\}}, D(T^2,RP+L) - \max\{0, S^1 - D(T^1,T^2)\}\}]$$

This expression is obtained by noting that any leftover from the supply contributed by the first PO not used to cover the demand between $T^1$ and $T^2$ may be used to cover the remaining demand up to RP+L and may not be double-counted.

In some examples, a deterministic lead time may be considered, which may assume that the lead time is equal to some constant l. At a given time t, the amount of supply received from the POs may be given by:

$$PO(t) := \sum_{i=1}^{n} PO_i 1_{\{T_i \leq t\}}$$

This quantity may be a random variable that depends on the realizations of the $T_i$'s. In some examples, the expected amount of supply received from the POs at time t may be expressed by taking the expectation of this expression:

$$\mathbb{E}[PO(t)] = \sum_{i=1}^{n} PO_i F_i(t)$$

The results may be derived by reasoning in terms of this expected received supply. In some examples, the items associated with the POs may be continuously arriving with a varying rate given at time t by:

$$f(t) := \sum_{i=1}^{n} PO_i f_i(t) \qquad (23)$$

Figure 14:
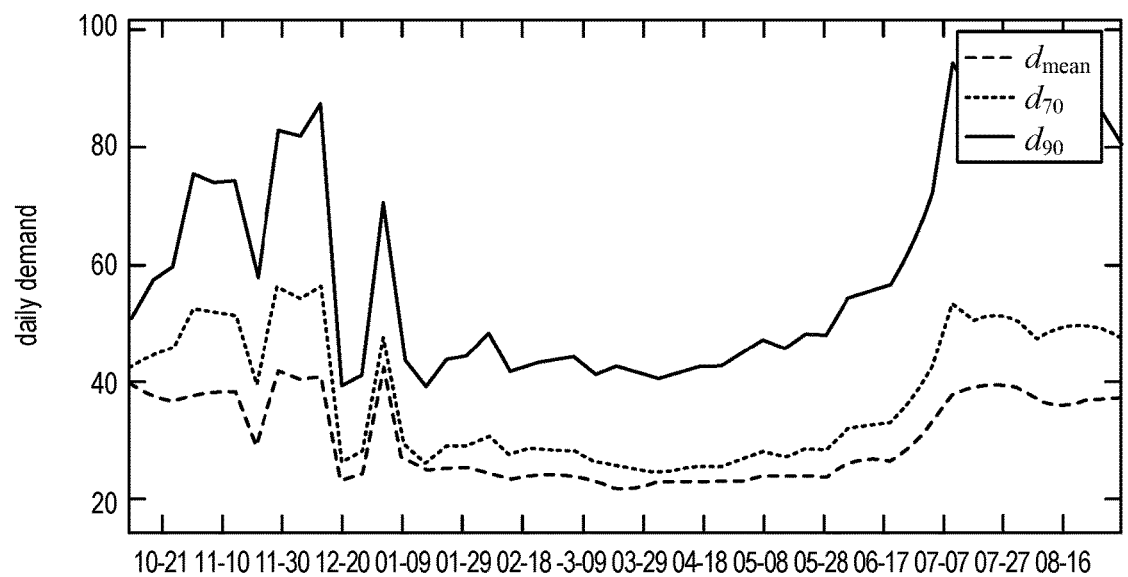
FIG. 14 illustrates forecasted daily demand for a particular item described herein, according to at least one example.

FIG. 14 illustrates forecasted daily demand for a particular item. For example, demand may consume whatever supply has built up at a rate d(t). This rate may not be deterministic. The daily demand may be an example given as a distribution by manual input (e.g., a forecasting team, a result of a procedural or machine learning algorithm, etc.). Some additional approximation may be made to account for the input. In some examples, the mean demand or a given percentile, such as the CR level, may be fixed and the rate corresponding to that level may be used. Values provided in this and other charts are for illustration purposes.

Figure 15:
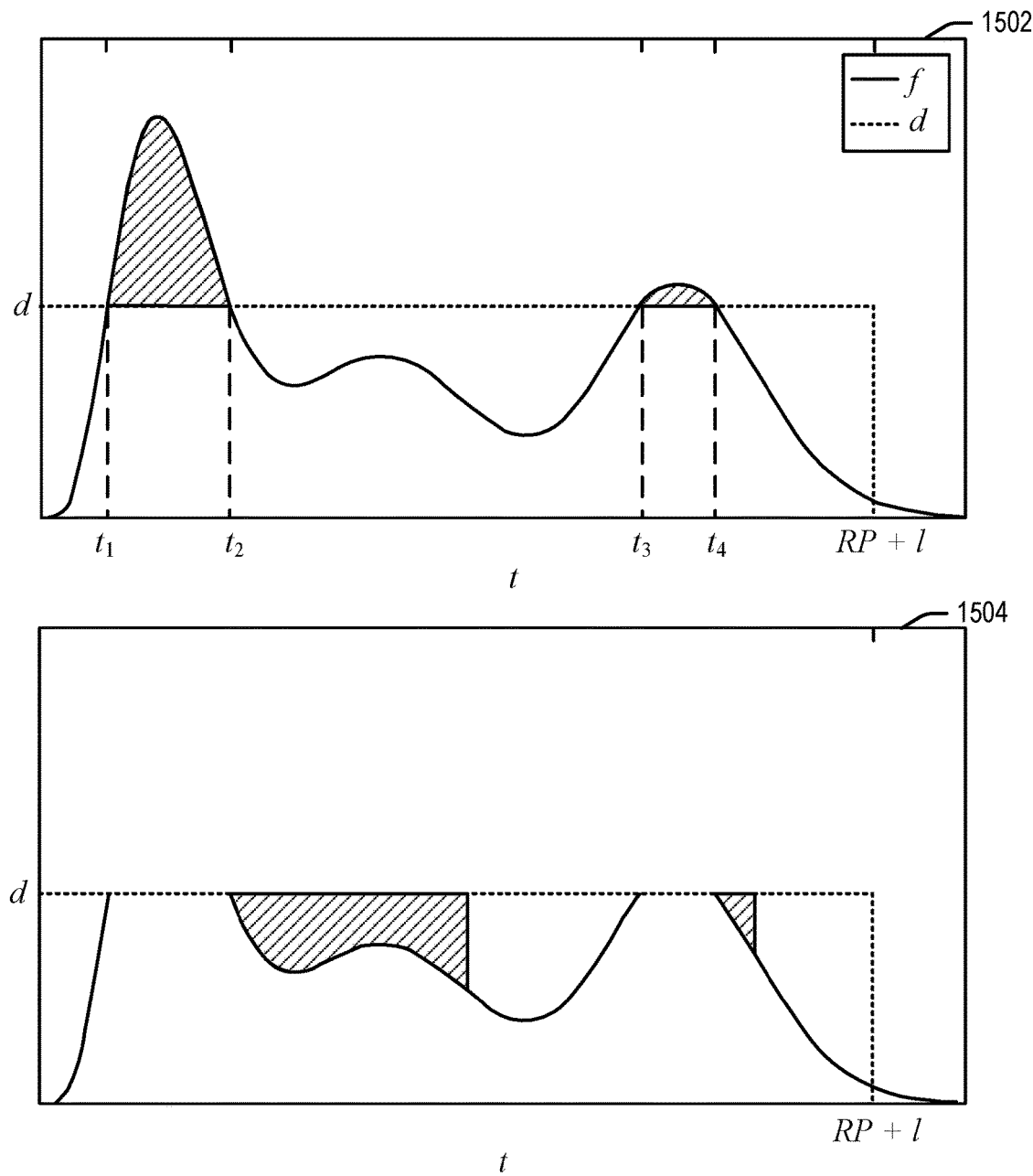
FIG. 15 illustrates supply with a constant demand described herein, according to at least one example.

FIG. 15 illustrates supply with a constant demand d. The objective may be to determine how much of the supply provided by the POs can fulfill demand. As a sample illustration, supply may pour into a leaky bucket with an inflow of f(t) and the leak having a maximum flow of d(t). Whenever the inflow is greater than the outflow, it causes the supply to build up, forming a reserve that can be later used to compensate for a lower inflow. The amount of supply provided by the POs is then equal to the amount poured out by the system at the end of the period RP+l.

A supply heuristic may be determined. For example, let $T_i$, i=1, ... , n be the random times at which the corresponding $PO_i$ arrive, let $F_i$ and $f_i$ denote their cumulative and probability distribution functions, respectively, and d(t) represent the demand rate. This rate may be proposed rate be chosen as a quantile curve $d_\beta$ of the demand distributions.

A deterministic lead time may be determined. The calculation of the amount of provided supply may be made of two terms. The first may be due to the immediate consumption of supply whose rate is capped by the minimum of f(t) and d(t). The second may be due to the potential reserve built up whenever the inflow was greater than d(t), which may be then consumed when the inflow drops below d(t). Letting S(l) be the supply contributed by the POs over the planning horizon, S(l) may be:

$$S(l) = s_1(l) + s_2(l), \qquad (24)$$

where $$s_1(l) = \int_{t=0}^{RP+l} \min(d(l), f(t)) \, dt \text{ and } s_2(l)$$

is the amount of supply used from the reserve.

An example procedural or machine learning algorithm that computes S(l) in a discrete case may include:

Let $s_1=0, 0, s_2=0$ and $b=0$ for $t=0$ to $RP+l$ $s_1 = s_1 + \min(f(t), d(t))$ if $f(t) > d(t)$ $b = b + f(t) - d(t)$ else if $b > 0$ $\tau = \min(b, d(t) - f(t))$ $s_2 = s_2 + \tau$ $b = b - \tau$ end end end return $S(l) := s_1 + s_2$ The algorithm may make one pass through time. $s_1$ can represent the first term of the supply due to the POs, while b records the reserve of supply that builds up whenever the expected arrival of POs is greater than the demand and pours into $s_2$ whenever the demand is greater than the PO supply.

Building upon the deterministic lead-time result, the stochastic lead-time can be determined. Let $\mathbb{E}[S]$ be the expected contribution to the supply brought by the POs, and let g (l) be the pdf of the stochastic lead time L:

$$\mathbb{E}[S] := \mathbb{E}_L[S(L)] \qquad (25)$$

$$= \int_{l=0}^{\infty} S(l) g(l) dl \qquad (26)$$

$$= \sum_{l=\underline{l}}^{\overline{l}} S(l) g(l)$$

where $\underline{l}$ and $\overline{l}$ are lower an upper bounds on the values of the lead-time, respectively.

The procedural or machine learning algorithm can be sped up by making on or more assumptions, including that the algorithm may be done in one iteration or in one pass. This may increase efficiency of the computation and/or reduce an amount of time to determine a result of the algorithm. For example, at the end of the calculation of S(l) the amount of supply that has built up may be stored (e.g., in a data store, memory, etc.) and used in a calculation. Consequently, S(l+1) may be calculated, and so on (e.g., with respect to various realizations of L, which range $\underline{l}$ from to $\overline{l}$, etc.). An example procedural or machine learning algorithm that computes S(l+1) in a discrete case may include:

Let $s_1=0, 0, s_2=0$ and $b=0$ for $t=0$ to $RP+\overline{l}$ $s_1 = s_1 + \min(f(t), d(t))$ if $f(t) > d(t)$ $b = b + f(t) - d(t)$ else if $b>0$ $\tau=\min(b,d(t)-f(t))$ $s_2=s_2+\tau$ $b=b-\tau$ end end $S=S+g(t)(s_1+s_2)$ end return $S$ Note that $g(t)=0$ for $t<\bar{l}$.

In some examples, the number of items associated with a PO may delay the arrival of the order. The arrival may be delayed beyond the planning horizon, which might contribute to fill the entire TIP. In some examples, the number of items associated with the PO can be limited.

In some examples, a maximum value M may limit the items in the PO. In some examples, if the items arrive before the end of the planning horizon, the items can be used to fill remaining demand regardless of its size, provided it is bigger than M. For example, if a size of the incoming PO is larger than the demand M, the size of the PO may not matter and only M units may be used. The pre-processing determination may include one or more of the following heuristics:
1. $\tilde{PO}_i=\min(\lceil TIP \rceil, PO_i)$, where the TIP may be rounded up if the result of pre-processing can only be stored as integer.
2. $\tilde{PO}_i=F_i(PH)\min(\lceil TIP \rceil, PO_i)$ A choice of a demand quantile may be determined. For example, a demand distribution quantile $d_\beta$ (e.g., or a mean, etc.) may be chosen as the consumption rate in the algorithm, which can make level $\beta$ a parameter of the algorithm. The parameter $\beta$ can be used as a hedging lever to reflect a varying reliance on incoming POs. For example, a low value of $\beta$ may imply that little of the incoming POs will be counted towards supply, while a large value of $\beta$ may allow for a larger portion of them to be used. In some examples, the mean demand $d_{mean}$ may be used for pre-processing.

In some examples, national balancing can affect the determination. For example, when national balancing is not considered, each recipient of the items (e.g., fulfillment center (FC), item provider, etc.) may be treated independently of the others. The TIP and/or supply used in the algorithm may be equal to the TIP and/or supply computed for that particular recipient. When national balancing is considered, a single recipient with a particular TIP and/or supply may correspond with the sum of the TIPs and/or supplies of all recipients.

In some examples, regional balancing may affect the determination. Regional balancing may be performed similarly to national balancing, based at least in part by combining the TIPs and/or supplies of all the recipients that could potentially balance items with the other recipients.

These determinations may be expressed in the following formula, where K is a set of indices of recipients (e.g., fulfillment centers (FCs), item providers, etc.) that can balance with the other recipients under consideration. When national balancing is not considered, this set may reduce to a singleton with only the index of the considered recipient. When national balancing is considered, it contains the indices of all the recipients in the marketplace. When regional balancing is considered, the determination may contain indices of all the recipients that can potentially be balanced with the current one (including itself). We then use the following value for the TIP in the algorithm:

$$TIP = \sum_{k \in K} TIP_k,$$

where $TIP_k$ is the TIP for $FC_k$. A similar calculation can be used for supplies.

In some examples, items may correspond with particular, additional calculations (e.g., items that are provided throughout the year (evergreen), items that are provided seasonally, etc.). In some examples, an order quantity of these items may use the calculation when national balancing is considered, when national balancing is not considered, and/or calculate item inventory individually for each item type. The three values may be compared to determine the final order quantities. Let LG equal when national balancing is considered, UG equal when national balancing is not considered, and SS equal the item inventory individually calculated for each item type, the following logic may be applied:

$$Q = \begin{cases} UG & \text{if } UG < SS, \\ SS & \text{if } LG < SS \leq UG, \\ LG & \text{if } SS \leq LG. \end{cases}$$

In some examples, these calculations may be used to determine the supply calculation in the recourse-order algorithms discussed at least with FIGS. 4-6. For example, in a recourse replenishment policy, ROQ is computed using the following formula:

$$ROQ=\min\{TILP-(S_1-S_1^T)-S_2^T, TIP-(I_0+S_1+S_2^T)\} \quad (27)$$

The notations may be identified as:
$I_0$: On-hand inventory,
$V LT_1$: Lead time of the current order,
TILP: Target inventory position between $V LT_1$ and PH,
$S_1$: Expected supply between now and $V LT_1$ (without considering the timing of demand realization),
$S_1^T$: Expected supply between now and $V LT_1$ (considering the timing of demand realization),
$S_2$: Expected supply between $V LT_1$ and PH (without considering the timing of demand realization),
$S_2^T$: Expected supply between $V LT_1$ and PH (considering the timing of demand realization),
$S_1$ and $S_1^T$ can be obtained readily given algorithm 2. Specifically, let $g^{V LT_1}(t)$ be the pdf of current order's lead time, we have the following algorithm.
The calculation to calculate $S_1$ and $S_1^T$ may include:

Let $s_1=0, s_2=0, s_3=0, S_1=0, S_1^T=0, b=0$ for $t=0$ to $\overline{VLT_1}$ $s_1=s_1+\min(f(t),d(t))$ $s_3=s_3+f(t)$ if $f(t)>d(t)$ $b=b+f(t)-d(t)$ else if $b>0$ $\tau=\min(b,d(t)-f(t))$ $s_2=s_2+\tau$ $b=b-\tau$ end end $S_1=S_1+g^{VLT_1}(t)s_3$ $S_1^T=S_1^T+g^{VLT_1}(t)(s_1+s_2)$ end return $S_1$ and $S_1^T$ The calculation of $S_2$ and $S_2^T$ may involve two random lead times. For example, assume $[l_i, u_j], i \in \mathfrak{X}, ,j \in \mathcal{J}$ are the possible realizations of the combinations of V $LT_1$ and PH, each associated with probability $p_{ij}$. In some examples, a sample subset of the possible realizations may be generated. The algorithm of calculating $S_2$ and $S_2^T$ can include:

```
Let S₂ = 0, S₂ᵀ = 0
for r ∈ {l_i i ∈ 𝔛}
    b = 0, s₁ = 0, s₂ = 0 and s₃ = 0
    for t = r to max{u_j j ∈ 𝒥}
        s₁ = s₁ + min(f(t), d(t))
        s₃ = s₃ + f(t)
        if f(t) > d(t)
            b = b + f(t) - d(t)
        else
            if b > 0
                τ = min(b, d(t) - f(t))
                s₂ = s₂ + τ
                b = b - τ
            end
        end
        S₂ = S₂ + p_{ri}s₃
        S₂ᵀ = S₂ᵀ + p_{ri}(s₁+s₂)
    end
end
return S₂ and S₂ᵀ
```

The forecasts of the VLT distributions may be returned as quantile-time pairs $(q, t_q)$ for $q \in \{1, \ldots, 99\}$. In some examples, the calculation of $F_i(t)$ and $f_i(t)$ for a given time t can be the inverse of the previous determination. For example, let $\underline{t}:=\max\{t_q:t_q \leq t\}$ and $\bar{t}:=\min\{t_q:t_q \geq t\}$, and $\bar{q}$ and $\underline{q}$ be the corresponding quantiles (divided by 100 so that they are between 0 and 1). $F_i(t)$ and $F_i(t)$ may be defined by:

$$F_i(t) = \underline{q} + \frac{\bar{q}-\underline{q}}{\bar{t}-\underline{t}}(t-\underline{t}),$$

$$f_i(t) = \frac{\bar{q}-\underline{q}}{\bar{t}-\underline{t}}$$

In some examples, when t is a random variable, F may be defined by:

$F_i(PH)=\Sigma P(PH=ph)F_i(ph).$

In some examples, coupled stochastic lead times may be determined. For example, to sample a subset (sample size S) of the combinations of the first lead time V $LT_1$ and the planning horizon PH, the process may be similar to algorithm 1, including:

1. Input: Sample size S, and a list of quantiles for the distributions of V $LT_1$ and PH respectively, denoted by $P^L$ and $P^U$.
2. Separate the data points associated with U into groups (e.g., bucketizing the quantiles to integer values, etc.). In each group, U may be associated with an integer value $u_k$. associated with some probability $p_k$. If U has K groups, then $$\sum_{k=1}^{K} p_k = 1.$$

3. In some examples, the method may use a Quasi Monte Carlo Method. For example, for each group k, pick a van der Corput sequence consisting of $P_k S$ points between 0.01 and 0.99. In some examples, a van der Corput sequence may include a low discrepancy sequence consisting of 0.5, 0.25, 0.75, 0.125, 0.625, 0.375, etc. The output may include the corresponding quantiles of distribution L, denoted by $l_{kj}$. In some examples, if $P_k S$ is larger than the number of available quantiles, the method may use all the available quantiles. In some examples, the method may obtain at most S sample points of (L, U).
4. Post processing. The distribution $l_{kj}$ may be grouped into integer numbers. The method may obtain a set of points $[l_i, u_i]$, and in some instances, one or more of these points may be associated with some probability $p_i^{L,U}$.

Figure 16:
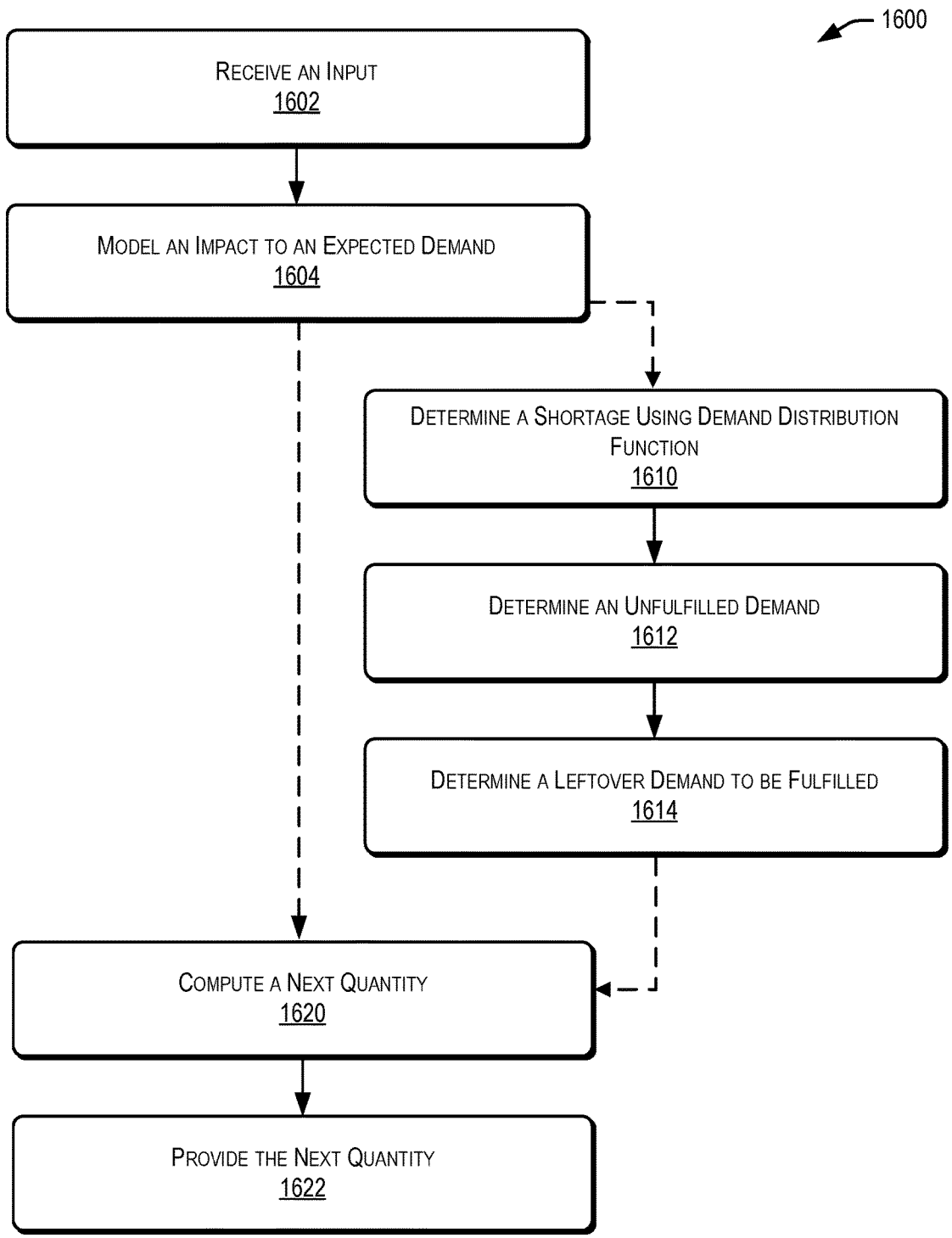
FIG. 16 illustrates an illustrative flow for determining a next quantity for an item described herein, according to at least one example.

FIG. 16 illustrates an illustrative flow for determining a next quantity for an item described herein, according to at least one example. In some examples, the one or more inventory management system(s) 310 (e.g., utilizing at least one of the input module 336, the demand module 338, the planning horizon module 340, and/or the next quantity module 342) or one or more user devices 304 shown in FIG. 3 may perform the process 1600 of FIG. 16.

Some or all of the process 1600 (or any other processes described herein, or variations, and/or combinations thereof) may be performed under the control of one or more computer systems configured with executable instructions and may be implemented as code (e.g., executable instructions, one or more computer programs, or one or more applications) executing collectively on one or more processors, by hardware or combinations thereof. The code may be stored on a computer-readable storage medium, for example, in the form of a computer program comprising a plurality of instructions executable by one or more processors. The computer-readable storage medium may be non-transitory.

The process 1600 may begin at 1602 by receiving an input. For example, the inventory management system(s) 310 may receive information associated with a delivery, demand, or order of an item. In some examples, the input can describe a quantity of the item available from one or more inventory facilities associated with the inventory management system. In some examples, the input can include arrival data, systematic factors, demand, order history, historical leftover demand, or other information that may help determine a next quantity for an item.

At 1604, a model of impact to an expected demand may be determined. For example, the inventory management system(s) 310 may determine a model for the demand. The model an impact to an expected demand for the item between a current planning horizon and a next planning horizon.

At 1610, the model may estimate a shortage in the quantity of the item within a current planning horizon. For example, the inventory management system(s) 310 may estimate the shortage based at least in part on a demand distribution function for the current planning horizon. In some examples, the estimation of the shortage may be based at least in part on a quantity of the item (e.g., the current quantity of the item in inventory, the quantity of the item scheduled to arrive within the current planning horizon, or any combination, etc.).

At 1612, the model may estimate an unfulfilled demand during the current planning horizon based at least in part on the shortage.

At 1614, the model may estimate a leftover demand to be fulfilled in the next planning horizon. In some examples, the leftover demand may be less than the unfulfilled demand. In some examples, the estimate a leftover demand may be estimated based at least in part on the unfulfilled demand and on historical leftover demand between planning horizons. Other methods of estimating a leftover demand may be discussed with FIG. 17 as well.

At 1620, a next quantity may be computed. For example, the inventory management system(s) 310 may determine the next quantity. The next quantity may be determined based at least in part on the computational models discussed herein. In some examples, the computation of the next quantity may be based at least in part on the estimated demand for the item in the next planning horizon. The estimated demand may be based at least in part on an optimization model that utilizes the modeled impact to the expected demand, a supply distribution function for the next planning horizon, and the leftover demand. In some examples, the computation of the next quantity may be based at least in part on the estimate a shortage in the quantity of the item within a current planning horizon, the estimate an unfulfilled demand during the current planning horizon, and/or the estimate a leftover demand to be fulfilled in the next planning horizon.

At 1622, the next quantity may be provided. For example, the inventory management system(s) 310 may provide the next quantity. The next quantity may be provided to an ordering system associated with the inventory management system(s) 310. The ordering system 350 and the inventory management system(s) 310 may be separate systems or may be combined as a single entity, as illustrated with the inventory management system 360.

Figure 17:
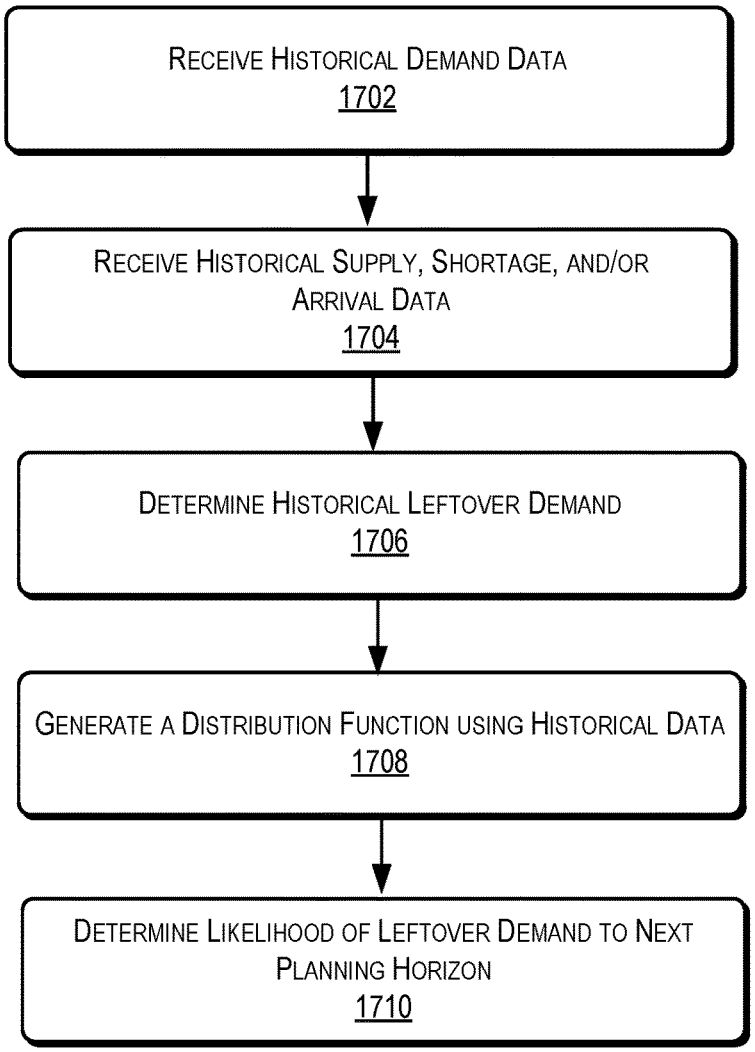
FIG. 17 illustrates an illustrative flow for determining a next quantity for an item described herein, according to at least one example.

FIG. 17 illustrates an illustrative flow for estimating a leftover demand described herein, according to at least one example. In some examples, the one or more inventory management system(s) 310 (e.g., utilizing at least one of the input module 336, the demand module 338, the planning horizon module 340, and/or the next quantity module 342) or one or more user devices 304 shown in FIG. 3 may perform the process 1700 of FIG. 17.

Some or all of the process 1700 (or any other processes described herein, or variations, and/or combinations thereof) may be performed under the control of one or more computer systems configured with executable instructions and may be implemented as code (e.g., executable instructions, one or more computer programs, or one or more applications) executing collectively on one or more processors, by hardware or combinations thereof. The code may be stored on a computer-readable storage medium, for example, in the form of a computer program comprising a plurality of instructions executable by one or more processors. The computer-readable storage medium may be non-transitory.

The process 1700 may begin at 1702 by receiving historical demand data. For example, the inventory management system(s) 310 may receive a quantity of an item (e.g., associated with item identifier A100, etc.) and/or group level of items (e.g., all electronics, all items less than $30, etc.) that are requested over time. This data may represent the number of orders for items requested as a function of time. The a distribution function may be generated from the historical demand data by, for example, applying one or more regression functions thereto.

At 1704, the process 1700 may receive historical supply and shortage data, including unfilled demand data. For example, the inventory management system(s) 310 may receive historical supply and shortage data for a date range and/or over one or more planning horizons. In some examples, the inventory management system(s) 310 may receive arrival data for the item. The arrival data may correspond with a date, time, method, or other information associated with when the item will become available from one or more inventory facilities during a current planning horizon.

In some examples, the process 1700 may generate one or more distribution functions. For example, the inventory management system(s) 310 may generate the distribution function from the historical and supply data by, for example, applying one or more regression functions thereto. The distribution function may include, for example, an arrival distribution function based at least in part on historical arrival data. The distribution function may include a shortage distribution function based at least in part on a current quantity of the item, the arrival distribution function, and a demand distribution function. The distribution function may include the leftover distribution function, in some examples, by further calculating or determining the function based at least in part on the shortage distribution function.

At 1706, the process 1700 may determine historical leftover demand. For example, the inventory management system(s) 310 may use the historical demand data and the historical supply and shortage data and derive historical leftover demand data. The leftover demand data may be less than the unfulfilled demand, at least in part because some demand (e.g., consumers, etc.) may not return to the item provider after the item provider fails to provide the item at a first time (e.g., demand from the user, etc.). A correction factor may be used to account for this loss of demand from one planning horizon to the next because of shortage. A leftover demand function may be generated from the historical leftover demand. For example, a leftover demand value may be a function of (e.g., equal to) a demand value minus a supply and shortage value, and correction factor to account for some demand that may not return in a next planning horizon because of the shortage. The leftover demand function may include a probability distribution over the different leftover demand value given the demand distribution function and the supply and shortage distribution function.

The inventory management system(s) 310 may determine historical leftover demand, including the correction factor, using various methods discussed throughout the disclosure. For example, the inventory management system(s) 310 may use one or more of the procedural or machine learning algorithms discussed herein.

In another example, the inventory management system(s) 310 may use A/B testing. The historical data may be specific to A/B testing. As a sample illustration, in one week, the inventory management system(s) 310 may determine a shortage to certain quantity of item. The inventory management system(s) 310 may measure the demand early in the next week. In another week, the inventory management system(s) 310 may determine a shortage to another quantity of item and measure the demand again in the next week, and so on and so forth. By varying the quantities and measuring the demand, the inventory management system(s) 310 may detect a pattern of returning demand. This pattern may indicate the impact to the demand (e.g., the correction factor), and can be used to determine the historical leftover demand as a function of the shortage.

In another example, the inventory management system(s) 310 may determine a velocity of demand. As a sample illustration, the inventory management system(s) 310 may determine historical data for a first week and may determine that the historical data indicates a shortage for that week by a certain quantity. The inventory management system(s) 310 may analyze data for the next week and to determine a quantity of demand early in the week. The inventory management system(s) 310 may compare that demand to a week where there was no prior shortage. The change to the demand may be attributed to the shortage, may account for the correction factor, and may be equal to the historical leftover demand between that first week and the next one.

At 1708, a distribution function may be generated using the historical data. For example, the inventory management system(s) 310 may compute a next quantity of an item and/or group level (GL) to order based at least in part on leftover demand data, historical leftover demand data, and/or leftover demand for an item. The distribution function may comprise an arrival distribution function, a demand distribution function, a shortage distribution function, or any other distribution functions discussed herein. The next quantity of the item to order may factor in any formula, model, or calculation described herein, including the optimization model, supply distribution function for the next planning horizon, and the historical leftover data.

At 1710, a likelihood of leftover demand (e.g., a leftover demand distribution function) to a next planning horizon may be determined, at least based in part on one of the methods for determining historical leftover demand discussed with 1706 and throughout the application. For example, the inventory management system(s) 310 may determine the leftover demand based at least in part on a likelihood of a returning demand in the next planning horizon given a current supply shortage of the item in the current planning horizon. In some examples, the likelihood may be based at least in part on the historical supply shortage and the associated historical impacts. In some examples, the historical leftover demand data may comprise a likelihood that may be estimated based at least in part on a procedural or machine learning algorithm, the algorithm being trained based at least in part on the historical leftover demand data. With the algorithm, the inventory management system(s) 310 may determine the likelihood based on the output of the algorithm (e.g., the output is the likelihood, etc.). With AB testing and velocity, the pattern may indicates the likelihood of leftover demand to a next planning horizon, expressed as potential leftover demand given a shortage.

Figure 18:
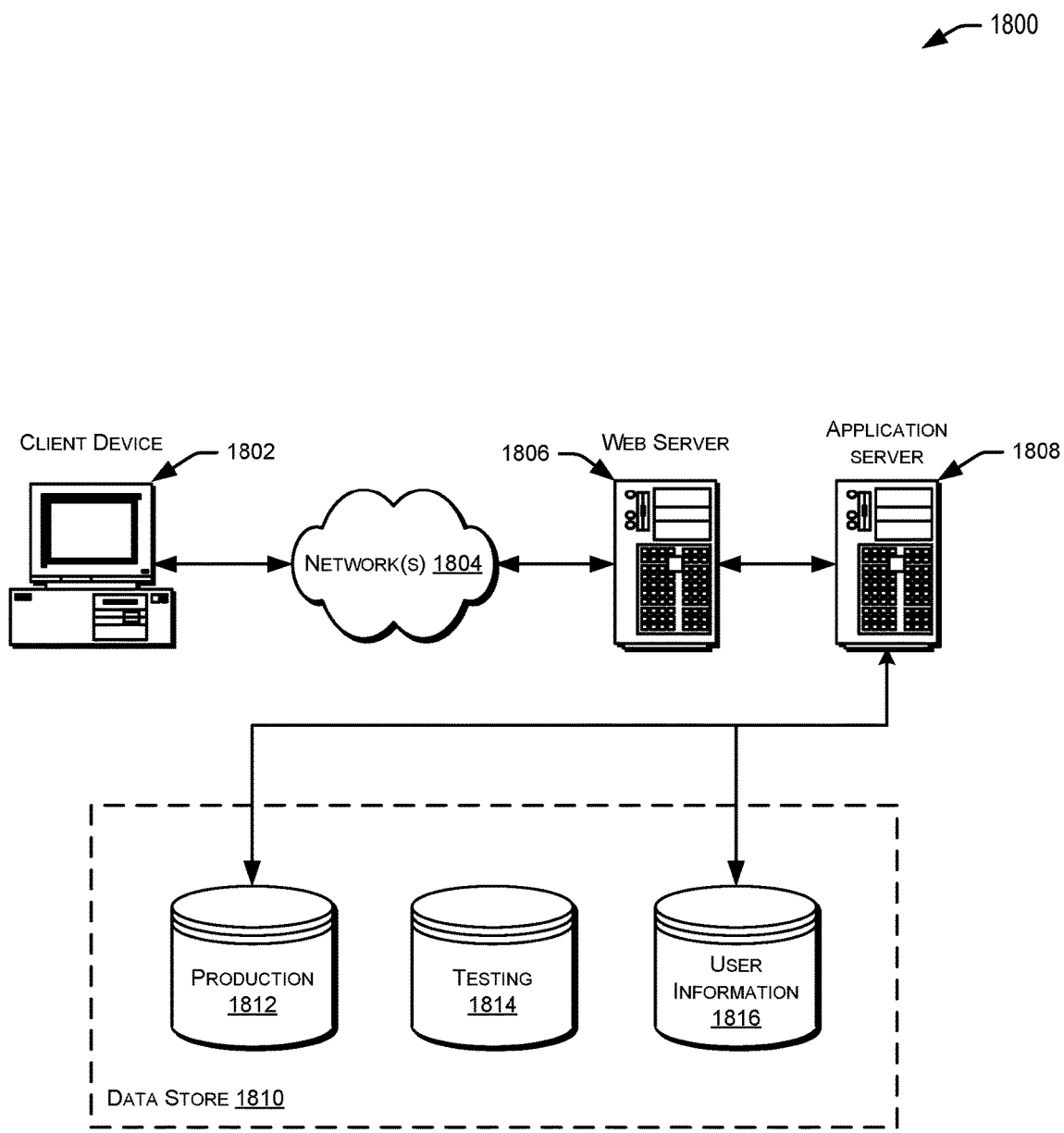
FIG. 18 illustrates an environment in which various embodiments can be implemented.

FIG. 18 illustrates aspects of an example environment 1800 for implementing aspects in accordance with various embodiments. As will be appreciated, although a Web-based environment is used for purposes of explanation, different environments may be used, as appropriate, to implement various embodiments. The environment includes an electronic client device 1802, which can include any appropriate device operable to send and receive requests, messages, or information over an appropriate network 1804 and convey information back to a user of the device. Examples of such client devices include personal computers, cell phones, handheld messaging devices, laptop computers, set-top boxes, personal data assistants, electronic book readers, and the like. The network can include any appropriate network, including an intranet, the Internet, a cellular network, a local area network, or any other such network or combination thereof. Components used for such a system can depend at least in part upon the type of network and/or environment selected. Protocols and components for communicating via such a network are well known and will not be discussed herein in detail. Communication over the network can be enabled by wired or wireless connections and combinations thereof. In this example, the network includes the Internet, as the environment includes a Web server 1806 for receiving requests and serving content in response thereto, although for other networks an alternative device serving a similar purpose could be used as would be apparent to one of ordinary skill in the art.

The illustrative environment includes at least one application server 1808 and a data store 1810. It should be understood that there can be several application servers, layers, or other elements, processes, or components, which may be chained or otherwise configured, which can interact to perform tasks such as obtaining data from an appropriate data store. As used herein the term "data store" refers to any device or combination of devices capable of storing, accessing, and retrieving data, which may include any combination and number of data servers, databases, data storage devices, and data storage media, in any standard, distributed, or clustered environment. The application server can include any appropriate hardware and software for integrating with the data store as needed to execute aspects of one or more applications for the client device, handling a majority of the data access and business logic for an application. The application server provides access control services in cooperation with the data store and is able to generate content such as text, graphics, audio, and/or video to be transferred to the user, which may be served to the user by the Web server in the form of HyperText Markup Language ("HTML"), Extensible Markup Language ("XML"), or another appropriate structured language in this example. The handling of all requests and responses, as well as the delivery of content between the client device 1802 and the application server 1808, can be handled by the Web server. It should be understood that the Web and application servers are not required and are merely example components, as structured code discussed herein can be executed on any appropriate device or host machine as discussed elsewhere herein.

The data store 1810 can include several separate data tables, databases or other data storage mechanisms and media for storing data relating to a particular aspect. For example, the data store illustrated includes mechanisms for storing production data 1812 and user information 1816, which can be used to serve content for the production side. The data store also is shown to include a mechanism for storing log data 1814, which can be used for reporting, analysis, or other such purposes. It should be understood that there can be many other aspects that may need to be stored in the data store, such as for page image information and to access right information, which can be stored in any of the above listed mechanisms as appropriate or in additional mechanisms in the data store 1810. The data store 1810 is operable, through logic associated therewith, to receive instructions from the application server 1808 and obtain, update or otherwise process data in response thereto. In one example, a user might submit a search request for a certain type of item. In this case, the data store might access the user information to verify the identity of the user and can access the catalog detail information to obtain information about items of that type. The information then can be returned to the user, such as in a results listing on a Web page that the user is able to view via a browser on the user device 1802. Information for a particular item of interest can be viewed in a dedicated page or window of the browser.

Each server typically will include an operating system that provides executable program instructions for the general administration and operation of that server and typically will include a computer-readable storage medium (e.g., a hard disk, random access memory, read only memory, etc.) storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 18. Thus, the depiction of the system 1800 in FIG. 18 should be taken as being illustrative in nature and not limiting to the scope of the disclosure.

The various embodiments further can be implemented in a wide variety of operating environments, which in some cases can include one or more user computers, computing devices or processing devices which can be used to operate any of a number of applications. User or client devices can include any of a number of general purpose personal computers, such as desktop or laptop computers running a standard operating system, as well as cellular, wireless, and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems, and other devices capable of communicating via a network.

Most embodiments utilize at least one network that would be familiar to those skilled in the art for supporting communications using any of a variety of commercially-available protocols, such as Transmission Control Protocol/Internet Protocol ("TCP/IP"), Open System Interconnection ("OSI"), File Transfer Protocol ("FTP"), Universal Plug and Play ("UpnP"), Network File System ("NFS"), Common Internet File System ("CIFS"), and AppleTalk®. The network can be, for example, a local area network, a wide-area network, a virtual private network, the Internet, an intranet, an extranet, a public switched telephone network, an infrared network, a wireless network, and any combination thereof.

In embodiments utilizing a Web server, the Web server can run any of a variety of server or mid-tier applications, including Hypertext Transfer Protocol ("HTTP") servers, FTP servers, Common Gateway Interface ("CGI") servers, data servers, Java servers, and business application servers. The server(s) also may be capable of executing programs or scripts in response to requests from user devices, such as by executing one or more Web applications that may be implemented as one or more scripts or programs written in any programming language, such as Java®, C, C#, or C++, or any scripting language, such as Perl, Python, or TCL, as well as combinations thereof. The server(s) may also include database servers, including without limitation those commercially available from Oracle®, Microsoft®, Sybase®, and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers, or other network devices may be stored locally and/or remotely, as appropriate. Where a system includes computerized devices, each such device can include hardware elements that may be electrically coupled via a bus, the elements including, for example, at least one central processing unit ("CPU"), at least one input device (e.g., a mouse, keyboard, controller, touch screen, or keypad), and at least one output device (e.g., a display device, printer, or speaker). Such a system may also include one or more storage devices, such as disk drives, optical storage devices, and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired)), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or Web browser. It should be appreciated that alternate embodiments may have numerous variations from that described above. For example, customized hardware might also be used and/or particular elements might be implemented in hardware, software (including portable software, such as applets), or both. Further, connection to other computing devices such as network input/output devices may be employed.

Storage media computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules, or other data, including RAM, ROM, Electrically Erasable Programmable Read-Only Memory ("EEPROM"), flash memory or other memory technology, Compact Disc Read-Only Memory ("CD-ROM"), digital versatile disk (DVD), or other optical storage, magnetic cassettes, magnetic tape, magnetic disk storage, or other magnetic storage devices, or any other medium which can be used to store the desired information and which can be accessed by a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the disclosure to the specific form or forms disclosed, but on the contrary, the intention is to cover all modifications, alternative constructions, and equivalents falling within the spirit and scope of the disclosure, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments of the disclosure and does not pose a limitation on the scope of the disclosure unless otherwise claimed. No language in the specification should be construed as indicating any non-claimed element as essential to the practice of the disclosure.

Disjunctive language such as the phrase "at least one of X, Y, or Z," unless specifically stated otherwise, is intended to be understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Preferred embodiments of this disclosure are described herein, including the best mode known to the inventors for carrying out the disclosure. Variations of those preferred embodiments may become apparent to those of ordinary skill in the art upon reading the foregoing description. The inventors expect skilled artisans to employ such variations as appropriate and the inventors intend for the disclosure to be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

All references, including publications, patent applications, and patents, cited herein are hereby incorporated by reference to the same extent as if each reference were individually and specifically indicated to be incorporated by reference and were set forth in its entirety herein.

What is claimed is:

1. An inventory management system comprising:
   a memory configured to store computer-executable instructions; and
   a processor in communication with the memory configured to execute the computer-executable instructions to at least:
      receive historical leftover demand data for an item between planning horizons of the inventory management system;
      receive an input associated with the item, the input describing a quantity of the item available from one or more inventory facilities associated with the inventory management system and arrival data for the item available from the one or more inventory facilities during a current planning horizon;
      model an impact to an expected demand for the item between the current planning horizon and a next planning horizon, based at least in part on the input, by at least:
         estimating a shortage in the quantity of the item within the current planning horizon based at least in part on a demand distribution function for the current planning horizon and on the quantity of the item,
         estimating an unfulfilled demand during the current planning horizon based at least in part on the shortage, and
         estimating a leftover demand to be fulfilled in the next planning horizon, the leftover demand being less than the unfulfilled demand and estimated based at least in part on the unfulfilled demand and on the historical leftover demand between the planning horizons;
      compute a next quantity of the item to order for the next planning horizon based at least in part on an optimization model that utilizes a supply distribution function for the next planning horizon, the quantity of the item available from the one or more inventory facilities, and the leftover demand; and
      provide, by the inventory management system, the next quantity of the item to an ordering system of the inventory management system.

2. The inventory management system of claim 1, wherein the optimization model implements a optimization formula expressed as:

$$\min_q E_{L,U,D_1,D_2}\{c_u[D_2 + \alpha(D_1 - I_0)^+ - q - (I_0 - D_1)^+]^+ +$$
$$c_0[q + (I_0 - D_1)^+ - D_2 - \alpha(D_1 - I_0)^+]^+\}$$

where $$\min_q$$

=minimum quantity; E=estimation; L, U, D1, and D2=demand for different time periods; $c_u$ is underage cost; $c_0$ is overage cost; $I_0$=initial inventory; and $\alpha$=estimate of a leftover demand that can be filled during the planning horizon.

3. The inventory management system of claim 1, wherein the input associated with the item is an expected date that the item arrives to the one or more inventory facilities and historical order data.

4. The inventory management system of claim 1, wherein the inventory management system further includes the ordering system and a resource system, wherein ordering system generates order plans to obtain the quantity of the item, and wherein the resource system generates resource plans to deploy resources during the next planning horizon for handling the quantity of the items.

5. A computer-implemented method, comprising:
receiving historical leftover demand data for an item over multiple planning horizons of an inventory management system;
receiving an input associated with the item, the input describing a quantity of the item available from one or more inventory facilities associated with the inventory management system and arrival data for the item available from the one or more inventory facilities during a current planning horizon;
modeling, based at least in part on the input, an impact to an expected demand for the item between the current planning horizon and a next planning horizon by at least:
estimating a shortage in the quantity of the item within the current planning horizon based at least in part on a demand distribution function for the current planning horizon and on the quantity of the item,
estimating an unfulfilled demand during the current planning horizon based at least in part on the shortage, and
estimating a leftover demand for the item based at least in part on the historical leftover demand data and the arrival data of the item, the leftover demand being less than unfulfilled demand during the current planning horizon;
estimating a quantity of the item to order for the next planning horizon based at least in part on an optimization model that utilizes a supply distribution function for the next planning horizon, the quantity of the item available from the one or more inventory facilities, and the leftover demand; and
providing the quantity of the item to order to an ordering system of the inventory management system.

6. The computer-implemented method of claim 5, further comprising:
determining an arrival distribution function based at least in part on historical arrival data; and
determining a shortage distribution function based at least in part on a current quantity of the item, the arrival distribution function, and the demand distribution function,
wherein the leftover demand is estimated based at least in part on a leftover demand distribution function, wherein the leftover demand distribution function is determined based at least in part on the shortage distribution function.

7. The computer-implemented method of claim 5, wherein the leftover demand is estimated based at least in part on a leftover demand distribution function that indicates a likelihood of a user returning to order the item in the next planning horizon after a supply for the item is zero during the current planning horizon.

8. The computer-implemented method of claim 5, wherein the leftover demand is estimated based at least in part on a leftover demand distribution function, wherein providing the quantity causes the ordering system to order fewer items based at least in part on output of the leftover demand distribution function during the current planning horizon.

9. The computer-implemented method of claim 5, wherein the leftover demand is estimated based at least in part on a leftover demand distribution function, wherein a lead time of the item is variable and is an input to the leftover demand distribution function.

10. The computer-implemented method of claim 5, wherein the leftover demand is estimated based at least in part on a leftover demand distribution function, wherein the leftover demand distribution function is based at least in part on a recourse policy.

11. The computer-implemented method of claim 5, wherein the leftover demand is estimated based at least in part on a leftover demand distribution function, wherein the leftover demand distribution function includes national balancing.

12. The computer-implemented method of claim 5, wherein the leftover demand is estimated based at least in part on a leftover demand distribution function, further comprising:
determining a type of the item; and
altering the leftover demand distribution function for the item based at least in part on the determination of the type of the item.

13. One or more non-transitory computer-readable storage media collectively storing computer-executable instructions that, when executed by one or more computer systems, configure the one or more computer systems to collectively perform operations comprising:
receiving historical leftover demand data for an item over multiple planning horizons of an inventory management system;
receiving an input associated with the item, the input describing a quantity of the item available from one or more inventory facilities associated with the inventory management system and arrival data for the item available from one or more inventory facilities during a current planning horizon;
modeling, based at least in part on the input, an impact to an expected demand for the item between the current planning horizon and a next planning horizon by at least:
estimating a shortage in the quantity of the item within the current planning horizon based at least in part on a demand distribution function for the current planning horizon and on the quantity of the item, estimating an unfulfilled demand during the current planning horizon based at least in part on the shortage, and estimating a leftover demand for the item to be fulfilled in the next planning horizon, the leftover demand being estimated based at least in part on the historical leftover demand data and the arrival data of the item, the leftover demand being less than unfulfilled demand during the current planning horizon;

computing a next quantity of the item to order for the next planning horizon based at least in part on an optimization model that utilizes a supply distribution function for the next planning horizon, the next quantity of the item available from the one or more inventory facilities, and the leftover demand; and providing the next quantity of the item to an ordering system of the inventory management system.

14. The one or more non-transitory computer-readable storage media of claim 13, wherein the leftover demand is estimated based at least in part on a leftover demand distribution function.

15. The one or more non-transitory computer-readable storage media of claim 13, the operations further comprising:

estimating a lead time for the item based at least in part on the supply distribution function for the item, wherein the next quantity is estimated by at least inputting the lead time and the leftover demand to the optimization model.

16. The one or more non-transitory computer-readable storage media of claim 13, wherein the optimization model alters a second quantity of items listed in a quantity order associated with the next planning horizon.

17. The one or more non-transitory computer-readable storage media of claim 13, wherein the optimization model generates additional quantities of other items associated with the next planning horizon, wherein a quantity is outputted for a particular item based at least in part on a respective leftover demand estimated for the particular item.

18. The one or more non-transitory computer-readable storage media of claim 13, wherein the leftover demand is altered based at least in part on an attrition rate.

19. The one or more non-transitory computer-readable storage media of claim 18, wherein the attrition rate varies depending upon a number of days which the item is out-of-stock.

20. The one or more non-transitory computer-readable storage media of claim 13, wherein the historical leftover demand data comprises historical supply shortage of the item and associated historical impacts to a demand for the item, and wherein the historical leftover demand data is estimated based at least in part on a likelihood of a returning demand in the next planning horizon given a current supply shortage of the item in the current planning horizon, wherein the likelihood is based at least in part on the historical supply shortage and the associated historical impacts.

21. The one or more non-transitory computer-readable storage media of claim 13, wherein the historical leftover demand data comprises a likelihood that is estimated based at least in part on a procedural or machine learning algorithm, the algorithm trained based at least in part on the historical leftover demand data.

\* \* \* \* \*